(12) United States Patent
Torigoe et al.

(10) Patent No.: US 9,185,010 B2
(45) Date of Patent: Nov. 10, 2015

(54) COMMUNICATION SYSTEM, COMMUNICATION METHOD, SERVER EQUIPMENT, AND COMMUNICATION EQUIPMENT

(75) Inventors: Keisuke Torigoe, Tokyo (JP); Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 341 days.

(21) Appl. No.: 13/580,623

(22) PCT Filed: Feb. 21, 2011

(86) PCT No.: PCT/JP2011/053687
§ 371 (c)(1),
(2), (4) Date: Sep. 14, 2012

(87) PCT Pub. No.: WO2011/102512
PCT Pub. Date: Aug. 25, 2011

(65) Prior Publication Data
US 2013/0024563 A1   Jan. 24, 2013

(30) Foreign Application Priority Data
Feb. 22, 2010   (JP) .................................. 2010-035684

(51) Int. Cl.
*G06F 15/16*       (2006.01)
*G06F 15/173*      (2006.01)
(Continued)

(52) U.S. Cl.
CPC ............ *H04L 43/0811* (2013.01); *H04L 41/12* (2013.01); *H04L 49/55* (2013.01); *H04L 69/40* (2013.01)

(58) Field of Classification Search
CPC ....................................................... H04L 41/12
USPC ......................................................... 709/204
See application file for complete search history.

(56) References Cited

U.S. PATENT DOCUMENTS 6,876,652 B1 *   4/2005   Bell et al. ....................... 370/386
8,396,952 B2 *   3/2013   DeCusatis et al. ............ 709/223
(Continued)

FOREIGN PATENT DOCUMENTS

CN   1409225 A    4/2003
CN   1875582 A    12/2006
(Continued)

OTHER PUBLICATIONS

Japanese Office Action dated Dec. 11, 2013, with partial English translation.
(Continued)

*Primary Examiner* — Gerald Smarth
(74) *Attorney, Agent, or Firm* — McGinn IP Law Group, PLLC

(57) ABSTRACT

A communication equipment notifies a server equipment of a communication port to which a communication cable is connected. If another communication port as a connection partner of the notified communication port is not yet connected to the communication cable, the server equipment transmits a first notification instruction to another communication equipment having the said another communication port. The said another communication equipment indicates, in a viewable manner, a communication port corresponding to the first notification instruction as a communication port to which the communication cable is required to be connected.

31 Claims, 14 Drawing Sheets

(51) Int. Cl.
  *H04L 12/26* (2006.01)
  *H04L 12/24* (2006.01)
  *H04L 12/939* (2013.01)
  *H04L 29/14* (2006.01)

(56) References Cited

U.S. PATENT DOCUMENTS

| | | | |
|---|---|---|---|
| 2002/0116485 A1* | 8/2002 | Black et al. | 709/223 |
| 2003/0055932 A1 | 3/2003 | Brisse | |
| 2005/0060574 A1* | 3/2005 | Klotz et al. | 713/201 |
| 2005/0076113 A1* | 4/2005 | Klotz et al. | 709/224 |
| 2005/0254421 A1* | 11/2005 | Galou et al. | 370/230 |
| 2007/0225032 A1 | 9/2007 | Saito | |
| 2008/0186875 A1* | 8/2008 | Kitani | 370/254 |
| 2008/0316940 A1* | 12/2008 | Brooks et al. | 370/254 |
| 2010/0002702 A1* | 1/2010 | Saito et al. | 370/392 |
| 2010/0215049 A1* | 8/2010 | Raza et al. | 370/401 |
| 2011/0231715 A1* | 9/2011 | Kunii et al. | 714/57 |

FOREIGN PATENT DOCUMENTS

| | | |
|---|---|---|
| CN | 101626381 A | 1/2010 |
| JP | 6-260235 A | 9/1994 |
| JP | 2004-032308 A | 1/2004 |
| JP | 2010-010997 A | 1/2010 |
| JP | 2010-016775 A | 1/2010 |

OTHER PUBLICATIONS

European Search Repot dated Apr. 10, 2014.
International Search Report in PCT/JP2011/053687 dated Mar. 29, 2011 (English Translation Thereof).
Chinese Office Action dated Jun. 23, 2014 with a partial English translation.

* cited by examiner

FIG. 3

| COMMUNICATION PORT IDENTIFICATION INFORMATION | CONNECTION STATUS INFORMATION | COMMUNICATION PORT IDENTIFICATION INFORMATION | CONNECTION STATUS INFORMATION | COMMUNICATION CONFIRMATION STATUS INFORMATION |
|---|---|---|---|---|
| PID1 | 0 | PID2 | 0 | 0 |
| ... | ... | ... | ... | ... |

COMMUNICATION SYSTEM, COMMUNICATION METHOD, SERVER EQUIPMENT, AND COMMUNICATION EQUIPMENT

TECHNICAL FIELD

The present invention relates to a communication system provided with a plurality of communication equipments that are configured to be mutually connectable through a communication cable.

BACKGROUND ART

There is known a communication system provided with: a plurality of communication equipments that are configured to be mutually connectable through a communication cable; and a server equipment that is communicatively connected to each of the plurality of communication equipments.

As one of this sort of communication systems, in a communication system described in Patent literature 1, each of communication equipments is provided with a communication port that is detachably connected with a communication cable. Further, each of the communication equipments is provided with a light emitting diode that emits light when a connection (link) is established between a communication port provided for the device of interest and a communication port provided for another communication equipment (i.e., when the communication cable is connected). The light emitting diodes are arranged corresponding to the respective communication ports (near respective communication ports).

According to this, by viewing emission states of the light emitting diodes, a user can easily recognize whether or not each of the communication ports is in a state of being communicable with another communication port.

CITATION LIST

Patent Literature

Patent literature 1: JP2004-32308A

SUMMARY OF INVENTION

However, in the above-mentioned communication system, when a user connects one end of a communication cable with a communication port, it is relatively difficult to identify a communication port to which the other end of the communication cable should be connected, which is a problem.

Therefore, an object of the present invention is to provide a communication system that can solve the above-mentioned problem that "when a user connects one end of a communication cable to a communication port, it is hard to identify a communication port to which the other end of the communication cable should be connected".

In an aspect of the present invention, a communication system has: a plurality of communication equipments; and a server equipment communicatively connected to each of the plurality of communication equipments. Each of the plurality of communication equipments has: a communication port to which a communication cable is connected in a detachable manner; a connection notification transmitting unit; and a first notification unit. The connection notification transmitting unit transmits, to the server equipment, communication port identification information for identifying the communication port to which the communication cable is connected. The first notification unit indicates, in a viewable manner, a communication port corresponding to a first notification instruction received from the server equipment as a communication port to which the communication cable is required to be connected. The server equipment has a connection configuration information storage unit and a first notification instruction transmitting unit. The connection configuration information storage unit stores connection configuration information indicating a correspondence relationship between a pair of communication ports expected to be connected with each other though the communication cable and a connection status of the pair of communication ports and the communication cable. The first notification instruction transmitting unit refers to the connection configuration information corresponding to the communication port identification information received from any of the plurality of communication equipments, and transmits, if another communication port of the pair of communication ports other than the communication port corresponding to the communication port identification information is not yet connected to the communication cable, the first notification instruction for identifying the another communication port to a communication equipment having the another communication port.

In another aspect of the present invention, communication method includes: a step of retaining, by a server equipment, connection configuration information indicating a correspondence relationship between a pair of communication ports expected to be connected with each other though a communication cable and a connection status of the pair of communication ports and the communication cable; a step of transmitting, by a communication equipment, communication port identification information for identifying a communication port to which the communication cable is connected, to the server equipment, a step of referring, by the server equipment, to the connection configuration information corresponding to the communication port identification information and transmitting, if another communication port of the pair of communication ports other than the communication port corresponding to the communication port identification information is not yet connected to the communication cable, a first notification instruction for identifying the another communication port to another communication equipment having the another communication port; and a step of indicating in a viewable manner, by the another communication equipment, the another communication port corresponding to the first notification instruction as a communication port to which the communication cable is required to be connected.

According to the present invention thus constructed, when one end of a communication cable is connected to a communication port, a user can easily identify a communication port to which the other end of the communication cable should be connected.

BRIEF DESCRIPTION OF DRAWINGS

The above-described object, effect, and features will be more apparent from description of exemplary embodiments in conjunction with the accompanying drawings.

FIG. 3 illustrates a connection configuration table stored in any of storage devices provided for a server equipment according to the first exemplary embodiment of the present invention.

DESCRIPTION OF EMBODIMENTS

Respective exemplary embodiments of a communication system, a communication method, a server equipment, a program, and a communication equipment according to the present invention will hereinafter be described referring to FIGS. 1 to 17.

First Exemplary Embodiment

Configuration

Figure 1:
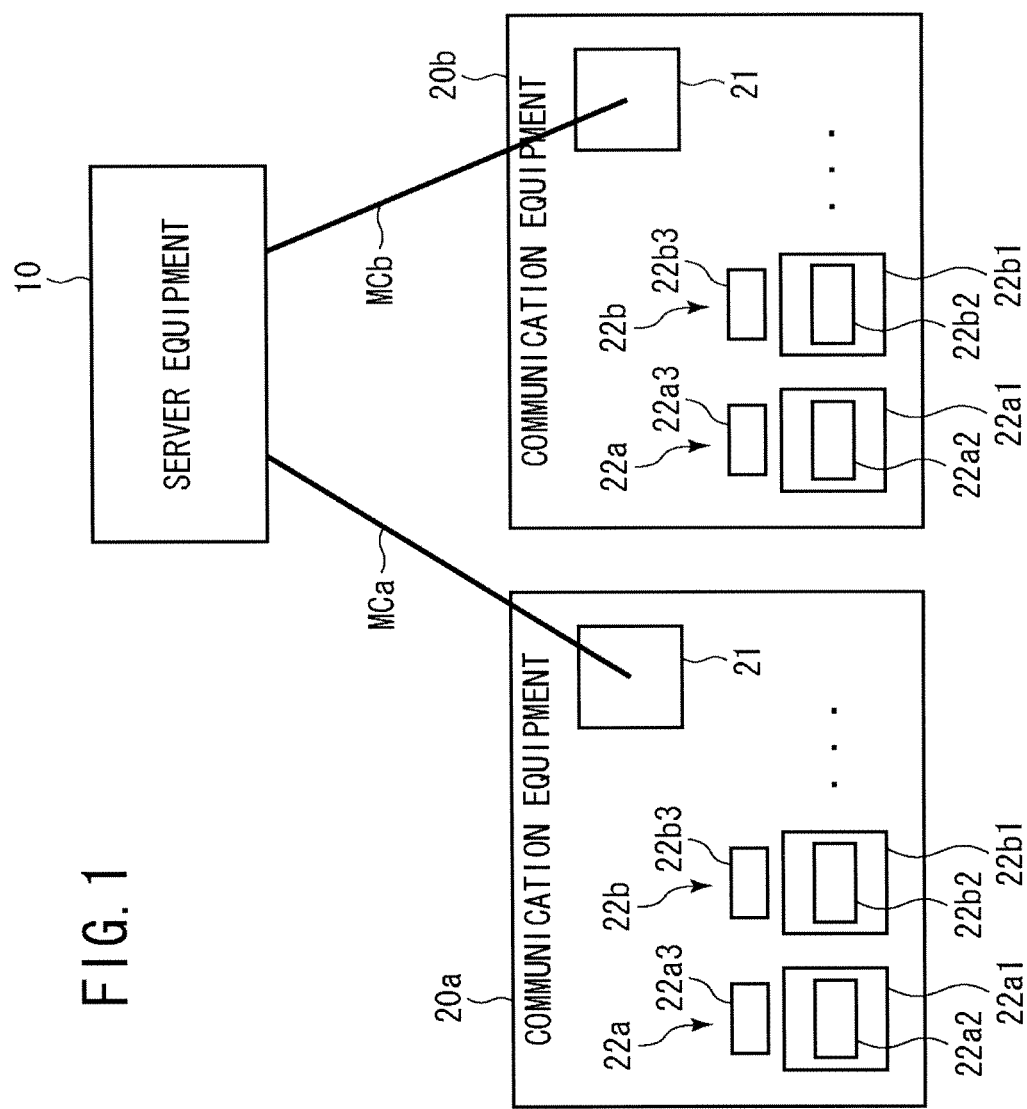
FIG. 1 is a diagram representing a schematic configuration of a communication system according to a first exemplary embodiment of the present invention.

As illustrated in FIG. 1, a communication system 1 according to a first exemplary embodiment includes: a server equipment 10; and a plurality of communication equipments 20a, 20b, . . . . In the present example, each of the communication equipments 20a, 20b, . . . is a relay device (such as a switch or a router) that relays communication. Alternatively, each of the communication equipments 20a, 20b, . . . may be an information processor such as a personal computer.

The server equipment 10 is an information processor. The server equipment 10 is provided with an unillustrated central processing unit (CPU), storage devices (a memory and a hard disk drive (HOD)), and an output device (in the present example, a display). The server equipment 10 is configured such that the CPU executes a program stored in any of the storage devices to thereby realize after-mentioned functions.

The communication equipment 20a is provided with a management communication port 21, a plurality of communication port units 22a, 22b, . . . , and an unillustrated CPU and a storage device (memory).

The management communication port 21 is connected with one end of a communication cable MCa. The other end of the communication cable MCa is connected to the server equipment 10. On the basis of this, the communication equipment 20a and the server equipment 10 are communicatively connected to each other. In the present example, the communication equipment 20a and the server equipment 10 make communication with each other according to TCP (Transmission Control Protocol) and SSL (Secure Socket Layer). Alternatively, the communication equipment 20a and the server equipment 10 may make communication with each other according to another communication protocol.

The communication port unit 22a includes a communication port 22a1, a connection detection unit 22a2, and a light emitting unit 22a3. The light emitting unit 22a3 constitutes a part of first notification means.

The communication port 22a1 is detachably connected with a communication cable. The communication equipment 20a is configured to be communicable with another communication equipment 20b, . . . in such a manner that the communication port 22a1 is connected with one end of the communication cable and the other end of the communication cable is connected to a communication port of the another communication equipment 20b, . . . .

The connection detection unit 22a2 detects that the communication port 22a1 is connected with the communication cable. In the present example, the connection detection unit 22a2 is provided with a pressure sensor that is in abutting contact with the communication cable in a state where the communication port 22a1 is connected (attached) with the communication cable. The pressure sensor generates different electrical signals respectively for a state of being in abutting contact with the communication cable and for a state of not being in abutting contact with it. On the basis of this, the connection detection unit 22a2 detects that the communication port 22a1 is connected with the communication cable.

Alternatively, the present invention may be configured to, with use of a sensor other than the pressure sensor, detect that the communication port 22a1 is connected with the communication cable. For example, the present invention may be configured such that the connection detection unit 22a2 is provided with an infrared sensor, and with use of the infrared sensor, detects whether or not the communication cable is present in the communication port 22a1 to thereby detect that the communication port 22a1 is connected with the communication cable.

Also, the connection detection unit 22a2 may be provided with a spring that is compressed in the state where the communication port 22a1 is connected (attached) with the communication cable; also provided with a sensor that detects a compression state of the spring; and thereby detect that the communication port 22a1 is connected with the communication cable.

Further, it is only necessary that the connection detection unit 22a2 can detect connection of the communication cable, and convert a result of the detection into a signal to notify a connection notification transmitting unit 31 of the result. For example, the connection detection unit 22a2 may use a switch mechanism in place of the pressure sensor to detect the connection and notify of a result of the detection.

The light emitting unit 22a3 is provided with a light emitting diode (LED). In the present example, the light emitting unit 22a3 is provided with an LED that emits light having a single color (e.g., blue color). Here, preferably, a color depending on content notified from the server equipment 10 is set. For this purpose, if there are a plurality of content to be notified, different color LEDs respectively depending on the pieces of content are provided for each of the light emitting units. The light emitting unit 22a3 is arranged near the communication port 22a1. That is, the light emitting unit 22a3 is arranged corresponding to the communication port 22a1.

In addition, the other communication port units 22b, . . . also have the same configuration as that of the communication port unit 22a.

Further, the communication equipment 20a is configured to realize after-mentioned functions in such a manner that the CPU executes a program stored in the storage device.

Also, the other communication equipments 20b, . . . have the same configuration as that of the communication equipment 20a as well.

(Functions)

Figure 2:
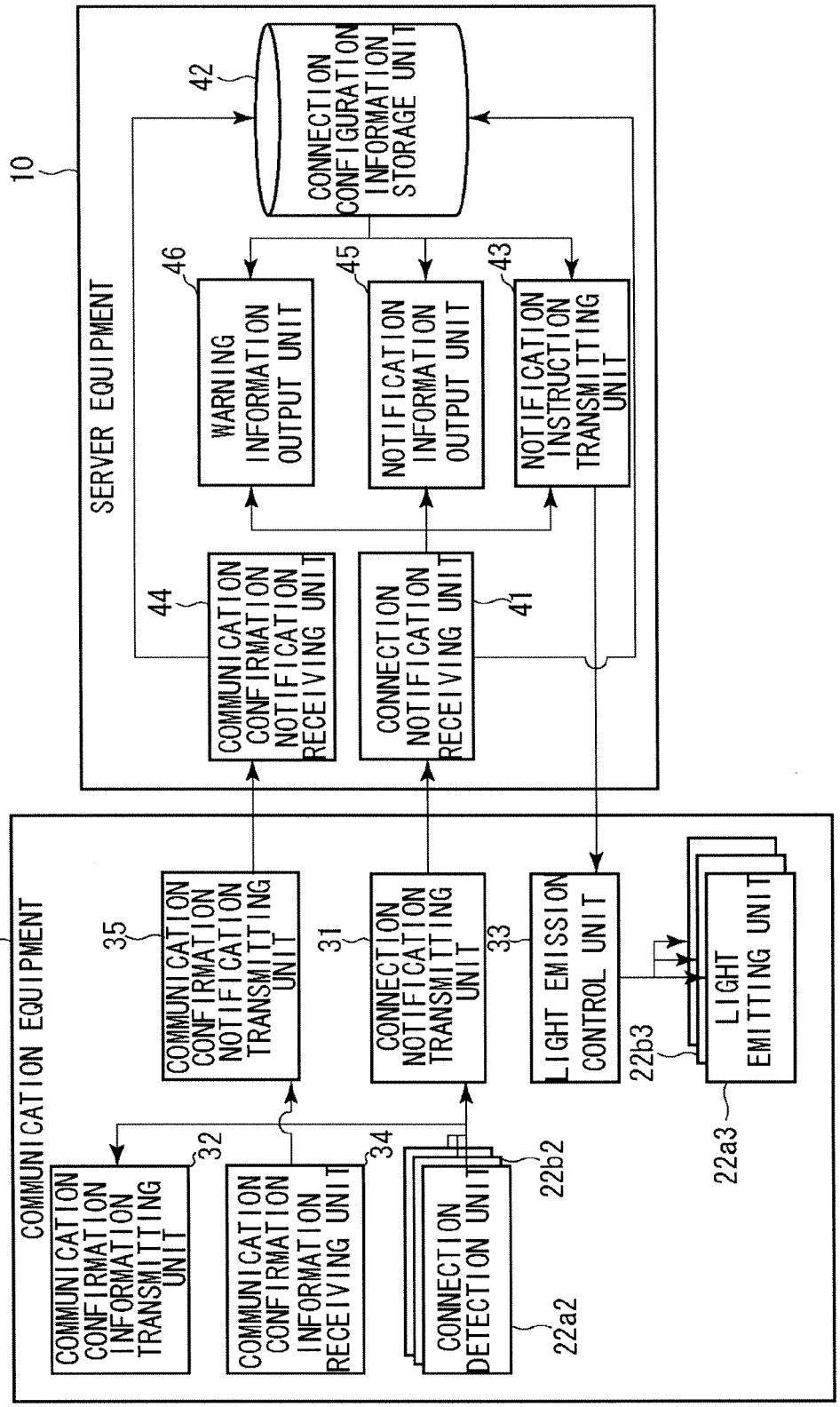
FIG. 2 is a block diagram representing an outline of functions of the communication system according to the first exemplary embodiment of the present invention.

FIG. 2 is a block diagram representing functions of the communication system 1 configured as described above. The functions are realized in such a manner that the CPU of the server equipment 10 executes the program or the like represented by after-mentioned flowcharts illustrated in FIGS. 7 and 10, and also the CPU of each of the communication equipments 20a, 20b, . . . executes the program or the like represented by after-mentioned flowcharts illustrated in FIGS. 6, 8, and 9.

Note that the functions of the communication equipment 20a are described here; however, the other communication equipments 20b, . . . also have the same functions as those of the communication equipment 20a.

The functions of the communication equipment 20a include the connection notification transmitting unit 31, a communication confirmation information transmitting unit 32, a light emission control unit (light emission control unit and a part of first notification unit) 33, a communication confirmation information receiving unit 34, and a communication confirmation notification transmitting unit 35.

Also, the functions of the server equipment 10 include a connection notification receiving unit 41, a connection configuration information storage unit 42, a notification instruction transmitting unit 43, a communication confirmation notification receiving unit 44, a notification information output unit 45, and a warning information output unit (first warning information output unit and second warning information output unit) 46.

The connection notification transmitting unit 31 transmits connection notification to the server equipment 10 if any of the connection detection units 22a2, 22b2, . . . detects that a communication cable is connected to a corresponding communication port 22a1, 22b1, . . . . The connection notification represents that the communication cable is connected to the communication port 22a1, 22b1, . . . , and includes communication port identification information for identifying the communication port 22a1, 22b1, . . . connected with the communication cable.

In the present example, the communication port identification information is information representing an MAC (Media Access Control) address that is preset for the communication port.

If some of the connection detection units 22a2, 22b2, . . . detect that communication cables are connected to corresponding communication ports 22a1, 22b1, . . . , the communication confirmation information transmitting unit 32 transmits, through the communication ports 22a1, 22b1, . . . , pieces of communication confirmation information to the communication cables respectively connected to the communication ports 22a1, 22b1, . . . . If the other ends of the communication cables are connected to other communication equipments, the pieces of communication confirmation information are respectively received by the other communication equipments. The pieces of communication confirmation information include pieces of communication port identification information for identifying the communication ports 22a1, 22b, . . . connected with the communication cables, respectively.

The light emission control unit 33 receives a first notification instruction from the server equipment 10. The first notification instruction includes communication port identification information for identifying a port that is not connected to a communication cable (hereinafter referred to as unconnected communication port identification information). If receiving the first notification instruction, the light emission control unit 33 makes a light emitting unit (e.g., light emitting unit 22a3), which is arranged corresponding to the communication port (e.g., communication port 22a1) indicated by the unconnected communication port identification information included in the first notification instruction, emit blue light.

If light emission control unit 33 receives the first notification instruction in this manner, the light emitting unit 22a3, 22b3, . . . , and the light emission control unit 33 notify a user of request to connect a communication cable to the communication port 22a1, 22b1, . . . indicated by the unconnected communication port identification information included in the first notification instruction.

The communication confirmation information receiving unit 34 receives communication confirmation information from another communication equipment 20b, . . . connected through a communication cable.

If the communication confirmation information receiving unit 34 receives the communication confirmation information, the communication confirmation notification transmitting unit 35 transmits communication confirmation notification to the server equipment 10. The communication confirmation notification includes: communication port identification information included in the received communication confirmation information; and communication port identification information for identifying a communication port that the communication equipment 20a (device of interest) uses at the time of receiving the communication confirmation information. That is, the communication confirming notification transmitting unit 35 transmits the communication confirming notification to the server equipment 10 with including, in the communication confirming notification, the two pieces of communication port identification information that specify the communication port pair between which communication connection is confirmed and the communication cable is connected.

The connection configuration information storage unit 42 stores a connection configuration table and a communication equipment identification table. FIG. 3 is a diagram illustrating an example of the connection configuration table according to the present invention. Referring to FIG. 3, the connection configuration table includes at least one piece of connection configuration information. The connection configuration information includes: communication port identification information for identifying each of one set of communication ports (communication port pair) expected to be connected through a communication cable; connection status information that represents whether or not each of the one set of communication ports is connected with the communication cable; and communication confirmation status information that represents whether or not it is confirmed that communication is available between the one set of communication ports.

In the connection configuration information, two pieces of connection status information respectively corresponding to two pieces of communication port identification information are set. On the basis of a value of connection status information, it can be confirmed whether or not a communication port corresponding to the connection status information and a communication cable are connected to each other. For example, the case where "0" is set in connection status information represents that a corresponding communication port and a communication cable are not connected to each other. On the other hand, the case where "1" is set in the connection status information represents that the corresponding communication port and the communication cable are connected to each other. Also, for one set of (two pieces of) communication port identification information, common communication confirmation status information is set. On the basis of a value of the communication confirmation status information, confirmation status whether or not communication is available between a communication port pair indicated by the one set of communication port identification information can be known. For example, the case where "0" is set in the communication confirmation status information represents that communication is not confirmed between a corresponding communication port pair. On the other hand, the case where "1" is set in the communication confirmation status information represents that communication is confirmed between the corresponding communication pair.

Figures 4, 5:
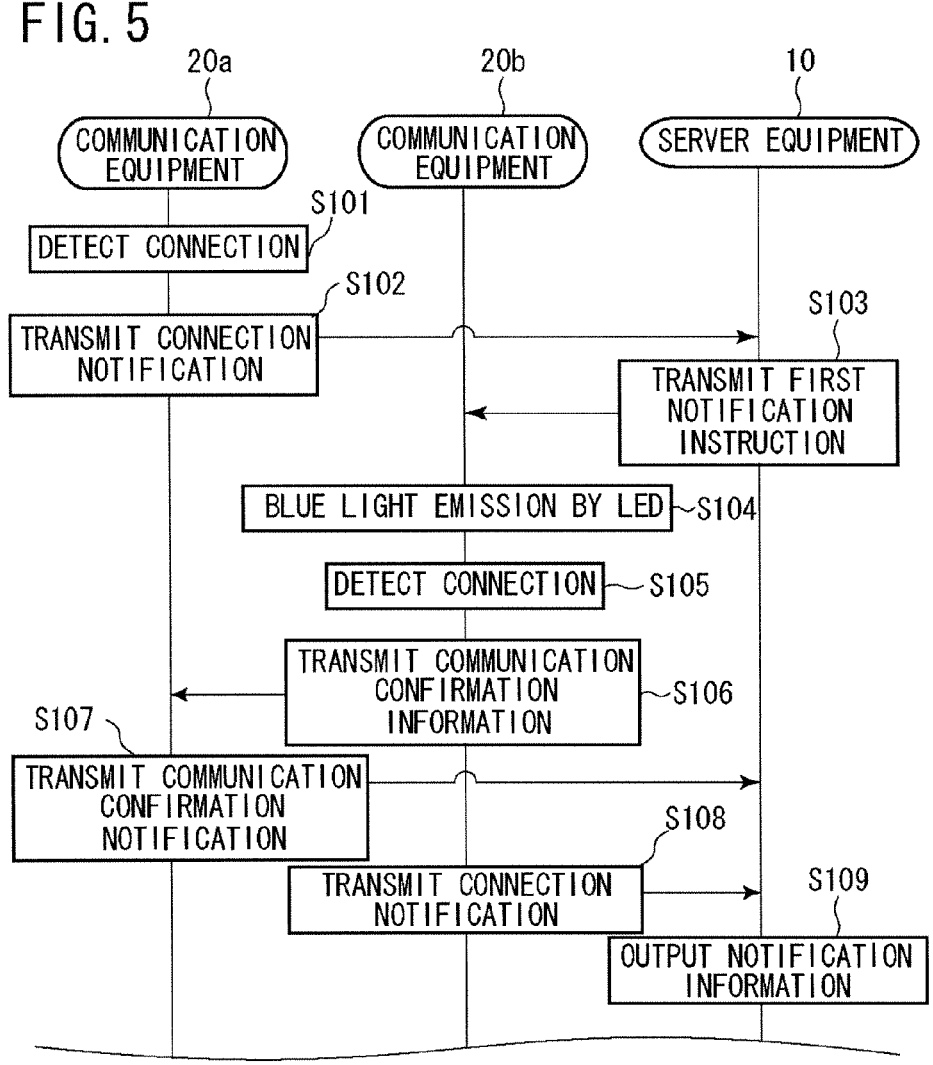
FIG. 4 illustrates a communication equipment identification table stored in any of the storage devices provided for the server equipment according to the first exemplary embodiment of the present invention.
FIG. 5 is a sequence diagram illustrating operation of the communication system according to the first exemplary embodiment of the present invention.

FIG. 4 is an example of the communication equipment identification table according to the present invention. Referring to FIG. 4, the communication equipment identification table includes at least one piece of device port correspondence information. The device port correspondence information includes: communication port identification information; and communication equipment identification information for identifying any of the communication equipments 20a, 20b, . . . , which is provided with a communication port indicated by the communication port identification information. In the present example, the communication equipment identification information is information representing an MAC address that is preset for the communication equipment 20a, 20b, . . . . Alternatively, the communication equipment identification information may be information representing an IP (Internet Protocol) address.

The connection notification receiving unit 41 receives connection notification from any of the communication equipments 20a, 20b, . . . . The connection notification receiving unit 41 uses, as a search key, communication port identification information included in the received connection notification to search the connection configuration information storage unit 42 (connection configuration table), and updates connection status information corresponding to the communication port identification information to "connected" (e.g., sets the connection status information to "1"). Also, the connection notification receiving unit 41 outputs the received connection notification to the notification instruction transmitting unit 43, the notification information output unit 45, and the warning information output unit 46.

The communication confirmation notification receiving unit 44 receives communication confirmation notification that is transmitted from any of the communication equipments 20a, 20b, . . . . The communication confirmation notification receiving unit 44 uses one set of (two pieces of) communication port identification information included in the received communication confirmation notification as a search key to search the connection configuration information storage unit 42 (connection configuration table), and updates communication confirmation status information corresponding to the one set of communication port identification information to "communication confirmed" (e.g., sets the communication confirmation status information to "1").

The notification instruction transmitting unit 43 uses, as a search key, communication port identification information included in connection notification received in the connection notification receiving unit 41 to search the connection configuration information storage unit 42 (connection configuration table), and specifies connection configuration information including the communication port identification information.

Referring to connection status information included in connection configuration information that is specified on the basis of connection notification, the notification instruction transmitting unit 43 checks connection status between a communication port pair indicated by the connection configuration information and a communication cable. If there is a communication port that is not connected to the communication cable, the notification instruction transmitting unit 43 uses communication port identification information on the communication port as a search key to search the connection configuration information storage unit 42 (communication equipment identification table), and obtains communication equipment identification information corresponding to the communication port identification information. Then, the notification instruction transmitting unit 43 transmits a first notification instruction including the communication port identification information on the communication port, which is confirmed not to be connected to the communication cable, to a communication equipment indicated by the obtained communication equipment identification information.

That is, the notification instruction transmitting unit 43 checks, in the connection configuration table, the connection status of the communication port serving as the other side of the communication port connected to the communication cable. At this time, the notification instruction transmitting unit 43 that detects the disconnection notifies the communication equipment having the unconnected communication port of the communication port identification information for identifying the unconnected communication port.

The notification information output unit 45 uses, as a search key, communication port identification information included in connection notification received in the connection notification receiving unit 41 to search the connection configuration information storage unit 42 (connection configuration table), and specifies connection configuration information including the communication port identification information.

Referring to connection status information included in the connection configuration information that is specified on the basis of the connection notification, the notification information output unit 45 checks connection status between a communication port pair indicated by the connection configuration information and a communication cable. Also, referring to communication confirmation status information included in the connection configuration information that is specified on the basis of the connection notification, the notification information output unit 45 checks confirmation status on communication connection between the communication port pair indicated by the connection configuration information. If both of the two communication ports included in the connection configuration information are connected to the communication cable, and the communication connection has been confirmed, the notification information output unit 45 outputs in a viewable manner, from the unillustrated output device, notification information indicating that the preset communication pair is communicable through the expected communication cable.

That the notification information output unit 45 checks in the connection configuration table according to the connection notification whether or not the communication port pair preset in the server equipment 10 is communicable. At this time, if between the communication port pair, the communication connection is confirmed, the notification information output unit 45 outputs, in a viewable manner, the notification information indicating the communication port pair between which the communication cable is correctly connected as expected to complete the communication connection.

In other words, if connection notification including each of one set of communication port identification information included in connection configuration information stored in the connection configuration information storage unit 42 is received, and communication confirmation notification including the one set of communication port identification information included in the connection configuration information is received, the notification information output unit 34 outputs notification information.

The warning information output unit 46 uses, as a search key, communication port identification information included in connection notification received in the connection notification receiving unit 41 to search the connection configuration information storage unit 42 (connection configuration table), and specifies connection configuration information including the communication port identification information. If communication port identification information that is coincident with the received communication port identification information is not set in the connection configuration information storage unit 42 (connection configuration table), the warning information output unit 46 outputs in a viewable manner, from the unillustrated output device to the server equipment 10, first warning information indicating that the unset communication port identification information is received. That is, if the connection configuration information including the connection port identification information included in the connection notification is not present in pieces of connection configuration information stored in the connection configuration information storage unit 42, the warning information output unit 46 outputs the first warning information. In addition, the first warning information is information representing that a communication cable is erroneously connected to any of the communication equipments 20a, 20b, . . . .

Further, the warning information output unit 46 uses, as a search key, the communication port identification information included in the connection notification received in the connection notification receiving unit 41 to search the connection configuration information storage unit 42 (communication equipment identification table), and obtains communication equipment identification information corresponding to the communication port identification information.

Referring to pieces of connection status information included in the connection configuration information that is specified on the basis of the connection notification, the warning information output unit 46 checks connection status between a communication port pair indicated by the connection configuration information and a communication cable. Also, referring to communication confirmation status information included in the connection configuration information that is specified on the basis of the connection notification, the warning information output unit 46 checks confirmation status on communication connection between the communication port pair indicated by the connection configuration information. If both of the two communication ports included in the connection configuration information are connected to the communication cable, but the communication connection has not been confirmed, the warning information output unit 46 outputs, in a viewable manner, second warning information indicating such a state from the unillustrated output device. That is, if in the specified connection configuration information, both of the pieces of connection status information respectively corresponding to the one set of communication port identification information represent that the communication cable is connected, and the communication confirmation status information represents that communication is not confirmed, the warning information output unit 46 outputs, in a viewable manner, the second warning information. The second warning information is information representing that a communication cable is erroneously connected to any of the communication equipments 20a, 20b, . . . .

In other words, if connection notification including each of one set of communication port identification information included in connection configuration information stored in the connection configuration information storage unit 42 is received, but communication confirmation notification including the one set of communication port identification information included in the connection configuration information is not received, the warning information output unit 46 outputs the second warning information in a viewable manner.

The above-described connection notification receiving unit 41 outputs the received connection notification to the notification instruction transmitting unit 43, the notification information output unit 45, and the warning information output unit 46, and in each of the functional blocks, the connection configuration information and device identification information according to the connection notification are specified; however, the present invention is not limited to this. Each of these functional blocks may confirm connection status between communication ports or whether or not communication between the communication ports is available, with use of connection configuration information that is specified when connection status information is updated by the connection notification receiving unit 41.

(Operation)

Next, an operation of the above-described communication system 1 is described referring to FIGS. 5 to 10. FIG. 5 is a sequence diagram representing the operation of the communication system 1.

Here, the description is continued on the assumption of the case where the connection configuration information storage unit 42 stores connection configuration information that, as one set of communication port identification information, includes communication port identification information "PID1" for identifying the communication port 22a1 of the communication equipment 20a and communication port identification information "PID2" for identifying the communication port 22a1 of the communication equipment 20b.

Referring to FIG. 5, described is operation up to request to connect the communication cable to the communication equipment 20b that is not connected, in response to connecting a communication cable to the communication port 22a1 of the communication equipment 20a.

Figure 6:
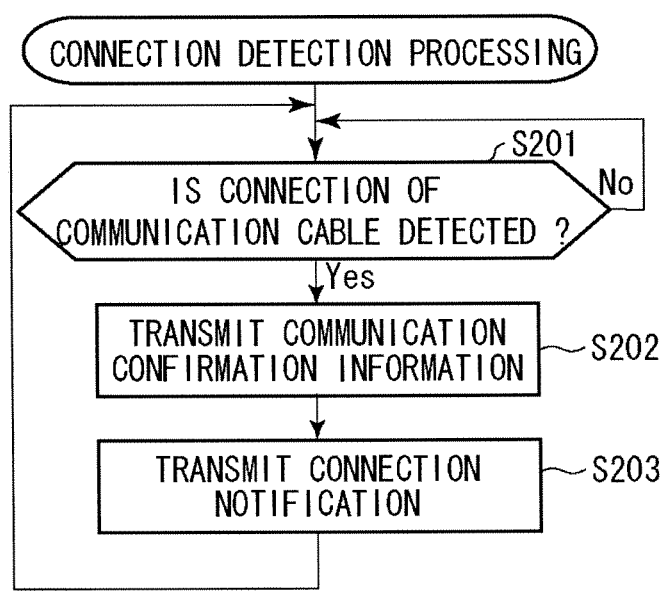
FIG. 6 is a flowchart illustrating a connection detection processing program executed by a communication equipment according to the first exemplary embodiment of the present invention.

During activation of the communication equipment 20a, the CPU of the communication equipment 20a executes a connection detection processing program illustrated by a flowchart of FIG. 6. To describe specifically, when starting to process the connection detection processing program, the communication equipment 20a waits in Step S201 until it detects the connection of the communication cable.

The communication equipment 20a having detected the connection of the communication cable determines a result in Step S201 as "Yes", and proceeds to Step S202 to transmit communication confirmation information (Step S201: Yes, S202). For example, the communication equipment 20a transmits the communication confirmation information including the communication port identification information "PID1" for identifying the communication port 22a1 to the other communication equipment 20b, . . . through the communication port 22a1.

Then, the communication equipment 20a transmits connection notification to the server equipment 10 (Step S203). Specifically, the communication equipment 20a transmits, to the server equipment 10, the connection notification including the communication port identification information "PID1" on the communication port 20a1 connected with the communication cable. Subsequently, the communication equipment 20a returns to Step S201 to wait until the communication cable is connected to the other communication port, and when detecting the connection, performs the processing steps in Steps S202 and S203.

Referring to FIG. 5, when a user (e.g. an administrator of the communication system 1) connects one end of the communication cable to the communication port 22a1 of the communication equipment 20a, the connection detection unit 22a2 of the communication equipment 20a detects that the communication cable is connected to the communication port 22a1 (Step S101). On the basis of this, the communication equipment 20a transmits the communication confirmation information including the communication port identification information "PID1" to the communication cable through the communication port 22a1 (not illustrated). In the present example, the other end of the communication cable connected to the communication port 22a1 is not connected to any of the communication equipments 20b, . . . . Accordingly, the communication equipment 20a fails to transmit the communication confirmation information (cannot transmit the communication confirmation information). Then, the communication equipment 20a transmits, to the server equipment 10, the connection notification including the communication port identification information "PID1" on the communication port 20a1 connected with the communication cable (Step S102).

When the connection notification is transmitted from the communication equipment 20a, the server equipment 10 checks connection status or the like on a communication port serving as a connection target of the communication port that is specified on the basis of the connection notification, and performs a process depending on the connection status (Steps S102 and S103). In the example illustrated in FIG. 5, the server equipment 10 determines that the communication port (communication equipment 20b) serving as the connection target is not connected with the communication cable, and transmits a first notification instruction to the communication equipment 20b (Step S103).

Figure 7:
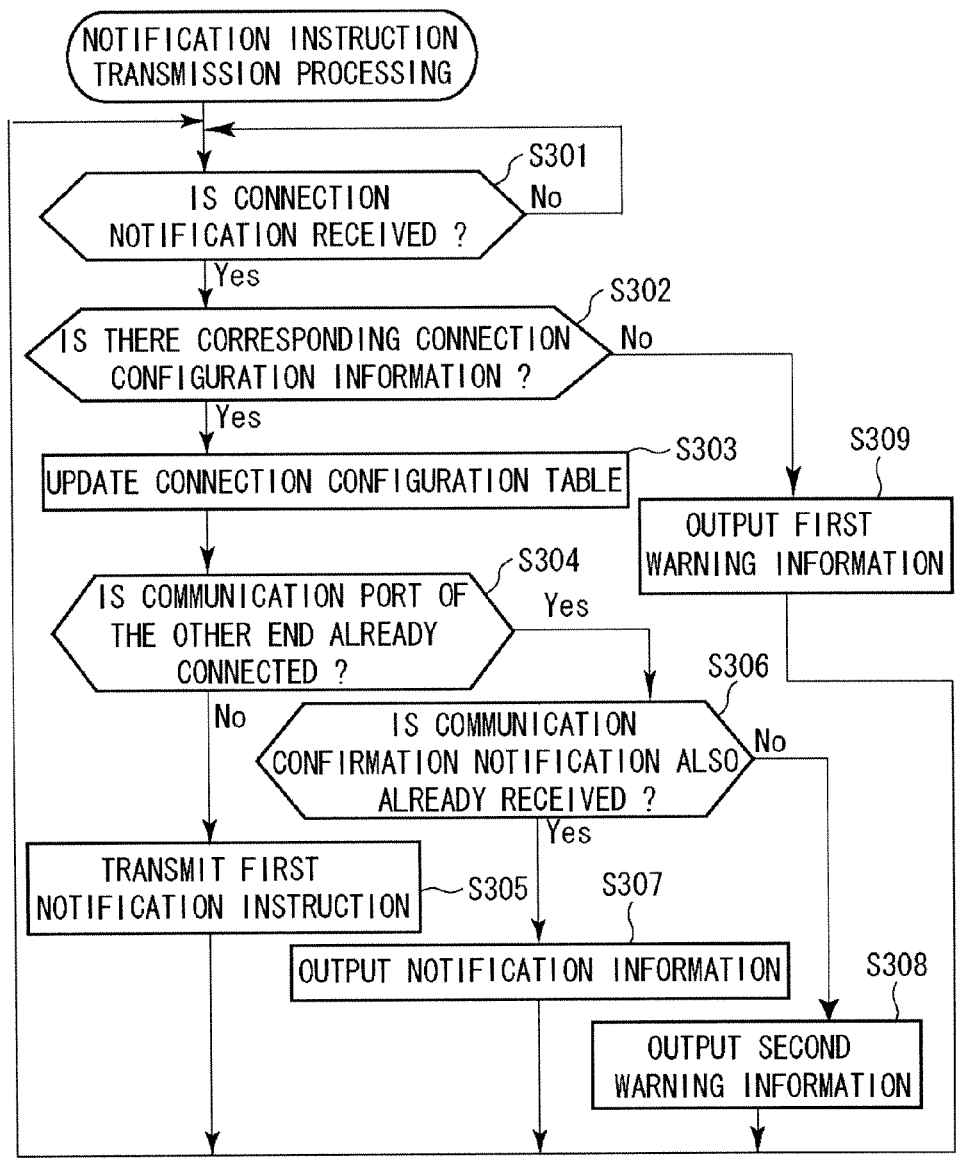
FIG. 7 is a flowchart illustrating a notification instruction transmission processing program executed by the server equipment according to the first exemplary embodiment of the present invention.

Referring to FIG. 7, details of a processing step in Step S103 are described. During activation of the server equipment 10, the CPU of the server equipment 10 executes a notification instruction transmission processing program illustrated by a flowchart of FIG. 7. To describe specifically, when starting to process the notification instruction transmission processing program, the server equipment 10 waits in Step S301 until it receives the connection notification.

When receiving the connection notification including the communication port identification information "PID1" from the communication equipment 20a, the server equipment 10 determines a result in Step S301 as "Yes", and proceeds to Step S302.

In Step S302, the server equipment 10 determines whether or not connection configuration information including the communication port identification information "PID1" included in the received connection notification is stored (i.e., corresponding connection configuration information is present) in the connection configuration information storage unit 42.

According to the above assumption, the connection configuration information including the communication port identification information "PID1" is stored in the connection configuration information storage unit 42. Accordingly, the server equipment 10 determines a result in Step S302 as "Yes", and proceeds to Step S303 to update the connection configuration table. Specifically, the server equipment 10 sets connection status information related to the communication port identification information "PID1" to "1" in the connection configuration information including the communication port identification information "PID1".

Subsequently, the server equipment 10 proceeds to Step S304 to determine whether or not the communication cable is also connected to the communication port of the other end. Specifically, in the connection configuration information including the communication port identification information "PID1", the server equipment 10 determined whether or not connection status information related to communication port identification information (i.e., "PID2") other than the communication port identification information "PID1" represents that the communication cable is connected (i.e., the connection status information is set to "1").

At this point, the connection status information related to the communication port identification information "PID2" is set to "0". Accordingly, the server equipment 10 determines a result in Step S304 as "No", and proceeds to Step S305.

Then, the server equipment 10 obtains communication equipment identification information (in this case, "DID2") included in device port correspondence information including the communication port identification information "PID2" from among pieces of device port correspondence information stored in the connection configuration information storage unit 42. Subsequently, the server equipment 10 transmits the first notification instruction including the communication port identification information "PID2" to the communication equipment 20b that is indicated by the obtained communication equipment identification information "DID2" (Step 9103 in FIG. 5).

After that, the server equipment 10 returns to Step S301 to wait until it receives connection notification, and when receiving the connection notification, performs processing steps in Steps S302 to S309. In addition, details of processing steps in Steps S306 to S309 will be described later.

Figure 8:
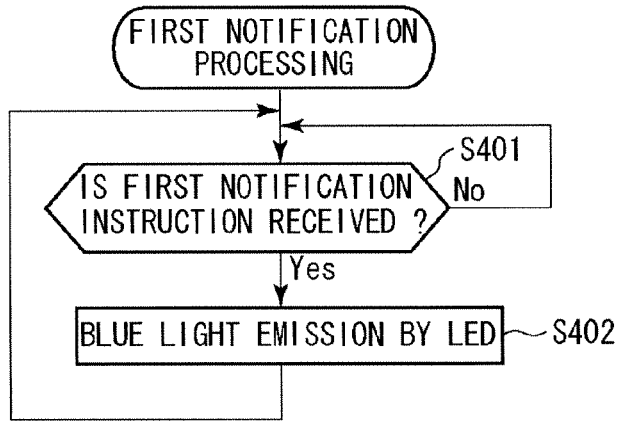
FIG. 8 is a flowchart illustrating a first notification processing program executed by the communication equipment according to the first exemplary embodiment of the present invention.

On the other hand, the CPU of the communication equipment 20b executes a first notification processing program illustrated by a flowchart of FIG. 8. To describe specifically, when starting to process the first notification processing program, the communication equipment 20b waits in Step S401 until it receives the first notification instruction.

In the present example, the communication equipment 20b receives the first notification instruction including the communication port identification information "PID2" from the server equipment 10. On the basis of this, the communication equipment 20b determines a result in Step S401 as "Yes", and proceeds to Step S402

Subsequently, the communication equipment 20b makes the light emitting unit 22a3, which is arranged corresponding to the communication port 22a1 indicated by the communication port identification information "PID2" included in the first notification instruction, emit blue light (S402).

After that, the communication equipment 20b returns to Step S401 to wait until it receives a first notification instruction, and when receiving the first notification instruction, performs Step S402.

In the example illustrated in FIG. 5, in the communication equipment 20b having received the first notification instruction from the server equipment 10, the light emitting unit 22a3 for the communication port 22a1 corresponding to the first notification instruction emits light. On the basis of this, the user recognizes that the user should connect the other end of the communication cable connected to the communication port 22a1 of the communication equipment 20a to the communication port 22a1 of the communication equipment 20b. Then, the user connects the other end of the communication cable to the communication port 22a1 of the communication equipment 20b.

Meanwhile, as with the communication equipment 20a, the communication equipment 20b executes the connection detection processing program illustrated in FIG. 6. Accordingly, the communication equipment 20b transmits communication confirmation information including the communication port identification information "PID2" for identifying the communication port 22a1 to the communication cable (in this case, the other communication equipment 20a) through the communication port 22a1 (Step S202 in FIG. 6, and Step S106 in FIG. 5). On the basis of this, the communication equipment 20a receives the communication confirmation information including the communication port identification information "PID2" from the communication equipment 20b.

Figure 9:
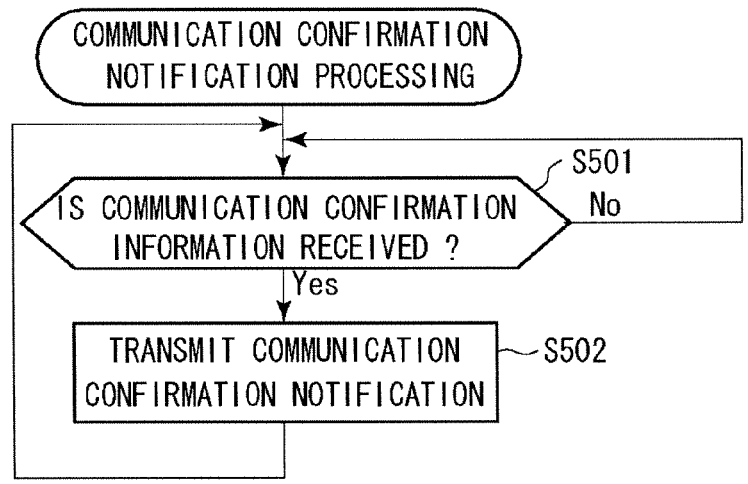
FIG. 9 is a flowchart illustrating a communication confirmation notification processing program executed by the communication equipment according to the first exemplary embodiment of the present invention.

On the other hand, during the activation of the communication equipment 20a, the CPU of the communication equipment 20a executes a communication confirmation notification processing program illustrated by a flowchart of FIG. 9. To describe specifically, when starting to process the communication confirmation notification processing program, the communication equipment 20a waits in Step S501 until it receives the communication confirmation information. Then, when receiving the communication confirmation information, the communication equipment 20a transmits, to the server equipment 10, communication confirmation notification including the communication port identification information included in the communication confirmation information and the communication port identification information on the reception port receiving the communication confirmation information (Step S502). Subsequently, the communication equipment 20a returns to Step S501 to wait until it receives communication confirmation information, and when receiving the communication confirmation information, performs the processing step in Step S502.

In the example illustrated in FIG. 5, the communication equipment 20a receives the communication confirmation information including the communication port identification information "PID2" from the communication equipment 20b. Accordingly, the communication equipment 20a transmits, to the server equipment 10, the communication confirmation notification including the communication port identification information "PID2" and the communication port identification information "PID1" on the reception port (S107).

Note that the communication confirmation notification includes: the communication port identification information "PID2" included in the received communication confirmation information; and the communication port identification information "PID1" for identifying the communication port that the communication equipment 20a (device of interest) uses at the time of receiving the communication confirmation information. Alternatively, the communication confirmation notification may be performed by notification of a first packet (PacketIN) according to an OpenFlow protocol. For example, the communication confirmation information transmitted from the communication equipment 20b does not match a flow entry set for the communication equipment 20a, and therefore the server equipment 10 (in this case, an open flow controller) is notified of the communication confirmation information as the first packet. By notifying the server equipment 10 of the communication port identification information on the communication port used by the device of interest together with the first packet, the server 10 can confirm the communication port pair between which communication becomes available.

Figure 10:
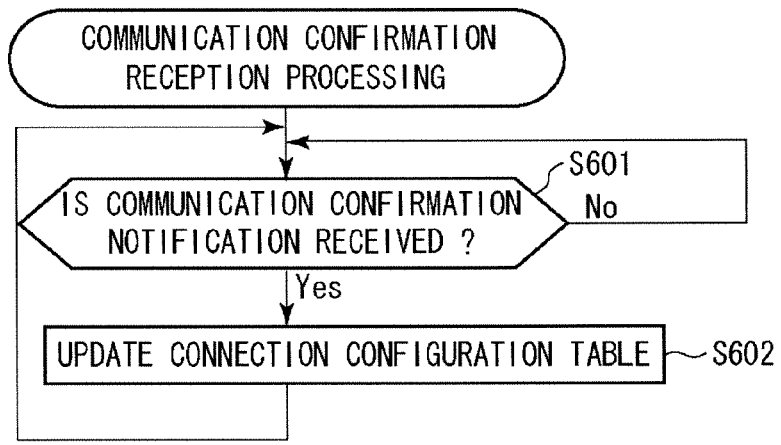
FIG. 10 is a flowchart illustrating a communication confirmation reception processing program executed by the server equipment according to the first exemplary embodiment of the present invention.

On the other hand, during the activation of the server equipment 10, the CPU of the server equipment 10 executes a communication confirmation reception processing program illustrated by a flowchart of FIG. 10. To describe specifically, when starting to process the communication confirmation reception processing program, the server equipment 10 waits in Step S601 until it receives the communication confirmation notification. Then, when receiving the communication confirmation notification, the server equipment 10 updates communication confirmation status information in connection configuration information indicated by the pieces of communication port identification information included in the communication confirmation notification to "communication availability confirmed" (Step S602). Subsequently, the server equipment 10 returns to Step S601 to wait until it receives communication confirmation notification, and when receiving the communication confirmation notification, performs the processing step in Step S602.

In the example illustrated in FIG. 5, the server equipment 10 receives the communication confirmation notification including the communication port identification information "PID1" and the communication port identification information "PID2" from the communication equipment 20a. Accordingly, the server equipment 10 sets the communication confirmation status information to "1" in the connection configuration information including the communication port identification information "PID1" and the communication port identification information "PID2".

Further, the communication equipment 20b transmits the connection notification including the communication port identification information "PID2" to the server device 10 in response to the connection detection in Step S105 (Step S203 in FIG. 6 and Step S108 in FIG. 5).

On the basis of the set of connection notification received from the communication equipments 20a and 20b, the server equipment 10 checks the connection of both of the communication port pair expected to be connected, and outputs, in a viewable manner, notification information indicating that the communication port pair has been connected (Step S109).

In the following, referring to FIG. 7, details of the processing step in Step S109 is described. The server equipment 10 receives the connection notification including the communication port identification information "PID2" from the communication equipment 20b. On the basis of this, the server equipment 10 determines a result in Step S301 as "Yes", and proceeds to Step S302.

The server equipment 10 determines whether or not connection configuration information including the communication port identification information "PID2" included in the received connection notification is stored in the connection configuration information storage unit 42.

According to the above assumption, the connection configuration information including the communication port identification information "PID2" is stored in the connection configuration information storage unit 42. Accordingly, the server equipment 10 determines a result in Step S302 as "Yes", and proceeds to Step S303 to update the connection configuration table. Specifically, in the connection configuration information including the communication port identification information "PID2", the server equipment 10 sets connection status information related to the communication port identification information "PID2" to "1".

Then, the server equipment 10 proceeds to Step S304 to determine whether or not the communication cable is also connected to the communication port serving as a connection target. Specifically, in the connection configuration information including the communication port identification information "PID2", the server equipment 10 determines whether or not the connection status information related to the communication port identification information (i.e., "PID1") other than the communication port identification information "PID2" represents that the communication cable is connected (i.e., the connection status information is set to "1").

At this point, the connection status information related to the communication port identification information "PID1" is set to "1". Accordingly, the server equipment 10 determines a result in Step S304 as "Yes", and proceeds to Step S306.

Subsequently, in the connection configuration information including the communication port identification information "PID2" included in the received connection notification, the server equipment 10 determines whether or not communication confirmation status information represents that the communication is confirmed (i.e., the communication confirmation status information is set to "1").

At this point, the communication confirmation status information is set to "1". Accordingly, the server equipment 10 determined a result in Step S306 as "Yes", and proceeds to Step S307 to output, in a viewable manner, the notification information through the output device (not illustrated).

The notification information is information representing that the communication cable is correctly connected to the communication equipments 20a, 20b, . . . . In the present example, the notification information includes the one set of communication port identification information (i.e., the communication port identification information "PID1" and the communication port identification information "PID2") on the basis of which the notification information is outputted.

Subsequently, the server equipment 10 returns to Step S301 to wait until it receives connection notification, and when receiving the connection notification, performs processing steps in Steps S302 to S309. In addition, details of processing steps in Steps S308 and 309 will be described later.

Next, referring to FIG. 7, described is operation for the case where one end of a first communication cable is connected to the communication port 22a1 of the communication equipment 20a, and then one end of a second communication cable different from the first communication cable is erroneously connected to the communication port 22a1 of the communication equipment 20b.

In this case, at the point when the one end of the second communication cable is erroneously connected to the communication port 22a1 of the communication equipment 20b, the communication equipment 20a cannot receive communication confirmation information from the communication equipment 20b. Accordingly, the communication equipment 20a does not transmit communication confirmation notification to the server equipment 10.

From the communication equipments 20a and 20b, one set of connection notification, which represents that the communication cables are respectively connected to the corresponding communication ports 22a1, is received, and therefore in the connection configuration information including the communication port identification information "PID1" and the communication port identification information "PID2", the pieces of connection status information respectively corresponding to the communication equipments 20a and 20b are set to "1". On the other hand, the communication confirmation status information included in the connection configuration information including the communication port identification information "PID1" and the communication port identification information "PID2" is still set to "0". Accordingly, the server equipment 10 proceeds to a processing step in Step S306 to determine a result of the processing step as "No". As a result, the server equipment 10 outputs, in a viewable manner, the second warning information through the unillustrated output device (Step S308).

The second warning information is information representing that the communication cables are erroneously connected to the communication equipments 20a, 20b, . . . . In the present example, the second warning information includes the one set of communication port identification information (i.e., the communication port identification information "PID1" and the communication port identification information "PID2") on the basis of which the second warning information is outputted.

Subsequently, the server equipment 10 returns to Step S301 to wait until it receives connection notification, and when receiving the connection notification, repeatedly performs the processing steps in Step S302 to S309.

Next, referring to FIG. 7, described is operation for the case where under the condition that communication port identification information "PID3" for identifying the communication port 22b1 of the communication equipment 20a is not included in any of the pieces of connection configuration information stored in the connection configuration information storage unit 42 (i.e., the communication port 22b1 is not expected to be connected with a communication cable), a communication cable is erroneously connected to the communication port 22b1.

In this case, the server equipment 10 determines a result of the processing step in Step S302 of FIG. 7 as "No", and outputs, in a viewable manner, the first warning information through the unillustrated output device.

The first warning information is information representing that a communication cable is erroneously connected to any of the communication equipment 20a, 20b, . . . . Specifically, the first warning information includes information indicating that a communication cable is connected to a communication port that is not expected to be connected. In the present example, the first warning information includes the communication port identification information on the basis of which the first warning information is outputted (i.e., the communication port identification information "PID3").

Subsequently, the server equipment 10 returns to step S301 to wait until it receives connection notification, and when receiving the connection notification, performs the processing steps in Steps S302 to S309.

As described above, according to the communication system according to the first exemplary embodiment of the present invention, when a user connects one end of a communication cable to a communication port 22a1, the communication equipment 20a provided with the communication port 22a1 transmits connection notification to the server equipment 10. The server equipment 10 updates connection status of the communication port indicated by the connection notification to "connected", and uses the connection configuration information table to check status of connecting a communication port, which is expected as a connection target, to the communication cable. At this time, if the communication port serving as a communication target is not connected to the communication cable, the server equipment 10 transmits a first notification instruction including communication port identification information on the communication port to the communication equipment 20b provided with the communication port.

Then, the communication equipment 20b having received the first notification instruction notifies the user of request to connect the communication cable to the communication port 22a1 indicated by the communication port identification information included in the first notification instruction. In this case, an LED that specifies the communication port necessary to be connected lights. As a result, the user can easily identify the connection target of the other end of the communication cable of which the one end is connected to the communication port. In the present example, when connecting the one end of the communication cable to the communication port 22a1 of the communication equipment 20a, the user can easily identify the communication port 22a1 of the communication equipment 20b, which is to be connected with the other end of the communication cable.

Further, in the communication system 1 according to the first exemplary embodiment, in the case where the server equipment 10 receives connection notification from any of the communication equipments 20a, 20b, . . . , if among the pieces of stored connection configuration information, connection configuration information including communication port identification information included in the connection notification is not present, the server equipment 10 outputs the first warning information representing that the communication equipment is erroneously connected with a communication cable.

That is, the server equipment 10 outputs, in a viewable manner, the first warning information if a communication cable is connected to a communication port that is not expected to be connected with any communication cable. On the basis of this, a user can easily recognize that the communication cable is erroneously connected to the communication equipment 20a, 20b, . . . .

Still further, in the communication system 1 according to the first exemplary embodiment, in the case where connection notification, which includes each of one set of communication port identification information included in stored connection configuration information, is received, but communication confirmation notification including the one set of communication port identification information included in the pieces of connection configuration information is not received, the server equipment 10 outputs the second warning information representing that a communication cable is erroneously connected to any of the communication equipments 20a, 20b, . . . .

That is, the server equipment 10 outputs, in a viewable manner, the second warning information if mutually different communication cables are respectively connected to one set of communication ports that are supposed to be connected by the same communication cable. On the basis of this, a user can easily recognize that one of the communication cables is erroneously connected to any of the communication equipments 20a, 20b, . . . .

Yet further, in the communication system 1 according to the first exemplary embodiment, in the case where connection notification, which includes each of one set of communication port identification information included in stored connection configuration information, is received, and communication confirmation notification including the one set of communication port identification information included in the connection configuration information is received, the server equipment 10 outputs notification information representing that a communication cable is correctly connected to any two of the communication equipments 20a, 20b, . . . .

That is, the server equipment 10 outputs, in a viewable manner, the notification information in the case where the communication cable is connected to each of one set of communication ports as expected. On the basis of this, a user can easily recognize that the communication cable is correctly connected to the two communication equipments 20a, 20b, . . . .

Note that the server equipment 10 according to the first exemplary embodiment preliminarily stores the pieces of connection configuration information; however, the present invention may be configured to generate pieces of connection configuration information on the basis of pieces of information representing the communication equipments 20a, 20b, . . . constituting the communication system 1 and pieces of information representing a preset connecting plan, and store the pieces of generated connection configuration information in any of the storage devices.

Second Exemplary Embodiment

Next, a communication system according to a second exemplary embodiment of the present invention is described. The communication system according to the second exemplary embodiment is different from the communication system according to the above first exemplary embodiment in detecting that a communication state between communication ports is an abnormal state. Accordingly, in the following, the description is provided with a focus on such a point of difference.

Each of light emitting units 22a3, 22b3, . . . according to the second exemplary embodiment is provided with: a first LED that emits, for example, blue light; and a second LED that emits light having a different color from that of the first LED (e.g., red).

Figure 11:
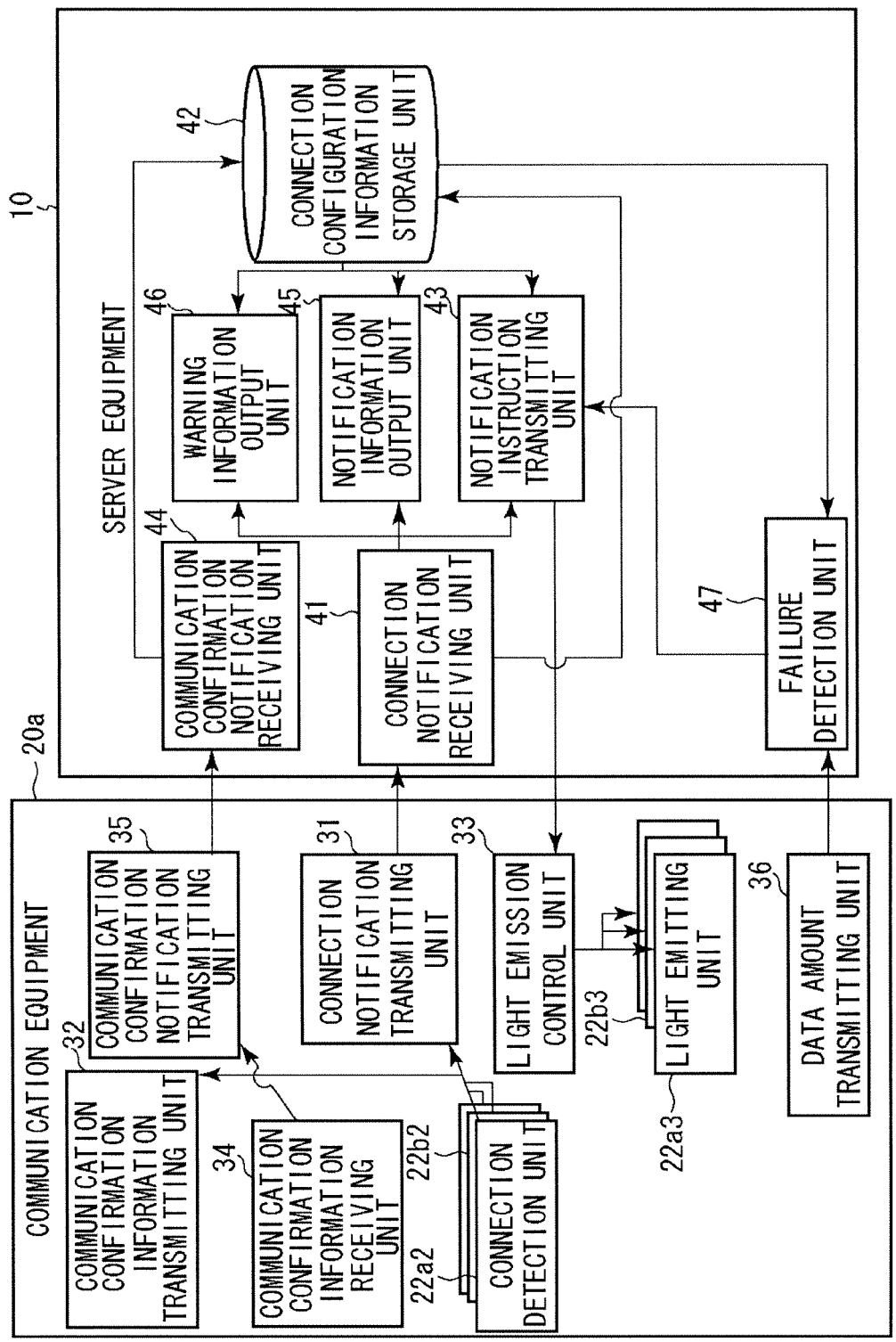
FIG. 11 is a block diagram representing an outline of functions of a communication system according to a second exemplary embodiment of the present invention.

As illustrated in FIG. 11, functions of a communication equipment 20a according to the second exemplary embodiment include, in addition to the functions of the communication equipment 20a according to the first exemplary embodiment, a data amount transmitting unit 36.

Also, functions of a server equipment 10 according to the second exemplary embodiment include, in addition to the functions of the server equipment 10 according to the first exemplary embodiment, a failure detection unit 47.

The data amount transmitting unit 36 transmits data amount information to the server equipment 10 every time a preset transmission period passes. The data amount information is information including communication port identification information, transmitted data amount, and received data amount regarding each of communication ports 22a1, 22b1, . . . provided for the communication equipment 20a.

The transmitted data amount is an amount of data that has been transmitted through the communication port during passage of the transmission period. The received data amount is an amount of data that has been received through the communication port during passage of the transmission period.

The failure detection unit 47 receives data amount information from each of the communication equipments 20a, 20b, . . . . Every time a preset detection period passes, the failure detection unit 47 extracts, from among pieces of connection configuration information stored in the connection configuration information storage unit 42, pieces of connection configuration information each in which communication confirmation status information is set to "1".

The failure detection unit 47 detects whether or not a communication state between communication ports indicated by one set of communication port identification information included in each of the pieces of extracted connection configuration information is the abnormal state.

Specifically, the failure detection unit 47 specifies pieces of data amount information respectively corresponding to the one set of communication port identification information included in the connection configuration information. The failure detection unit 47 calculates a value (first value) obtained by, from transmitted data amount included in one (first data amount information) of the one set of specified data amount information, subtracting received data amount included in the other one (second data amount information) of the one set of specified data amount information. Further, the failure detection unit 47 calculates a value (second value) obtained by, from transmitted data amount included in the second data amount information, subtracting received data amount included in the first data amount information.

If at least one of the first and second values is larger than a preset threshold value, the failure detection unit 47 detects that the communication state between the communication ports indicated by the one set of communication port identification information is the abnormal state.

In this manner, the failure detection unit 47 receives a transmitted data amount and a received data amount for each of the communication ports, and on the basis of the received transmitted data amount and received data amount, detects that a communication state between communication ports is the abnormal state.

If the failure detection unit 47 detects that a communication state between communication ports is the abnormal state, the notification instruction transmitting unit 43 transmits a second notification instruction to each of communication equipments 20a, 20b, . . . provided with the communication ports. The second notification instruction includes a corresponding one of pieces of communication port identification information for identifying the communication ports.

The light emission control unit 33 receives the second notification instruction from the server equipment 10. The second notification instruction includes a corresponding one of the pieces of communication port identification information. When receiving the second notification instruction, the light emission control unit 33 makes any of light emitting units 22a3, 22b3, . . . , which is arranged corresponding to a communication port 22a1, 22b1, . . . indicated by the communication port identification information included in the second notification instruction, emit red light (i.e., makes the second LED emit light).

In this manner, when the light emission control unit 33 receives the second notification instruction, the light emitting unit 22a3, 22b3, . . . and the light emission control unit 33 notify a user that a state of the communication port 22a1, 22b1, . . . indicated by the communication port identification information included in the second notification instruction is the abnormal state. That is, any of the light emitting units 22a3, 22b3, . . . and the light emission control unit 33 constitute a second notification unit.

Figure 12:
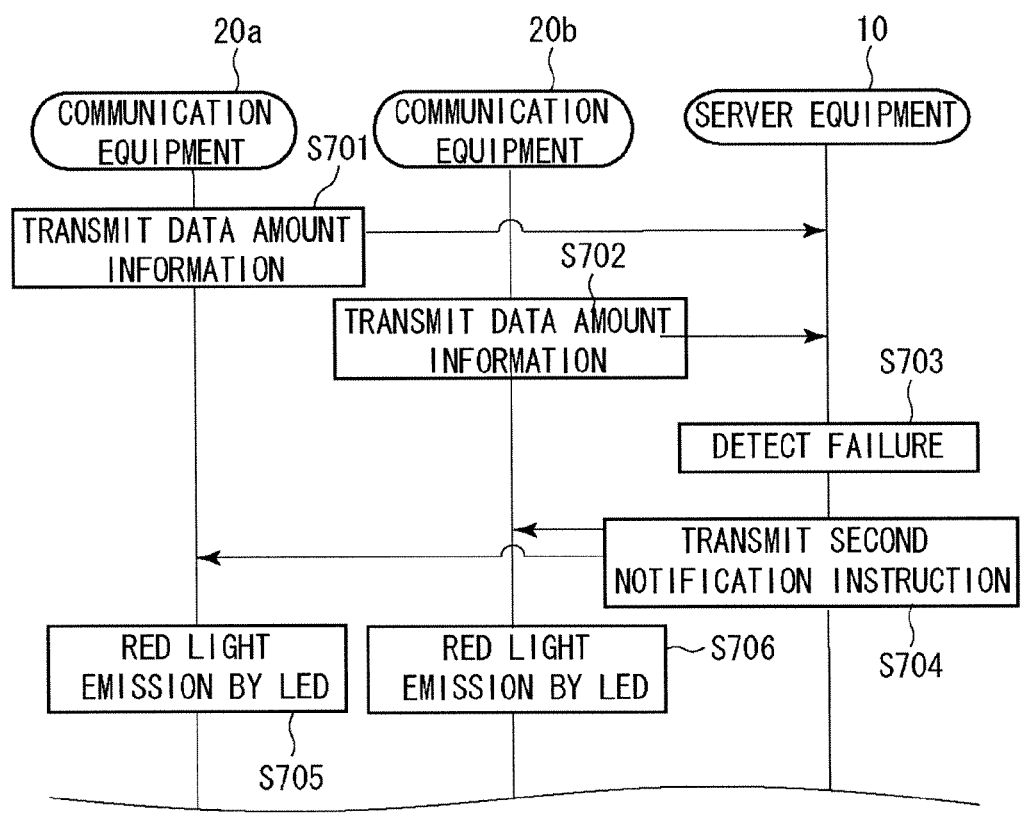
FIG. 12 is a sequence diagram illustrating operation of the communication system according to the second exemplary embodiment of the present invention.

Next, operation of the communication system 1 according to the second exemplary embodiment is described referring to FIG. 12.

First, each of the communication equipments 20a and 20b transmits data amount information to the server equipment 10 every time the transmission period passes (Steps S701 and S702)

In the following, the description is continued on the assumption of the case where a communication state between the communication port 1 of the communication equipment 20a and the communication port 22a1 of the communication equipment 20b is the abnormal state.

In this case, on the basis of pieces of connection configuration information stored in the connection configuration information storage unit 42 and the pieces of received data amount information, the server equipment 10 detects that the communication state between the communication port 22a1 of the communication equipment 20a and the communication port 22a1 of the communication equipment 20b is the abnormal state (Step S703).

Then, the server equipment 10 transmits the second notification instruction including the communication port identification information "PID1" for identifying the communication port 22a1 of the communication equipment 20a to the communication equipment 20a. Further, the server equipment 10 transmits the second notification instruction including the communication port identification information "PID2" for identifying the communication port 22a1 of the communication equipment 20b to the communication equipment 20b.

In the communication equipment 20a, the light emitting unit 22a3 that is arranged corresponding to the communication port 22a1 indicated by the communication port identification information "PID1" received from the server equipment 10 emits red light (Step S705).

Similarly, in the communication equipment 20b, the light emitting unit 22a3 that is arranged corresponding to the communication port 22a1 indicated by the communication port identification information "PID2" received from the server equipment 10 emits red light (Step S706).

As described above, according to the communication system according to the second exemplary embodiment of the present invention, the same action and effect as those of the communication system 1 according to the first exemplary embodiment can be produced.

Further, according to the communication system 1 according to the second exemplary embodiment, the server equipment 10 can detect that a communication state between communication ports is the abnormal state.

In addition, if it is detected that a communication state between communication ports is the abnormal state, the communication system 1 according to the second exemplary embodiment notifies a user of the detection. According to this, the user can easily recognize that the state between the communication ports is the abnormal state. Further, the user can also easily identify the communication ports in the abnormal state.

Note that each of the communication equipments 20a, 20b, . . . according to the second exemplary embodiment is configured to, when receiving the first notification instruction, make a corresponding light emitting unit 22a3, 22b3, . . . emit blue light, and on the other hand, when receiving the second notification instruction, make the corresponding light emitting unit 22a3, 22b3, . . . emit red light. That is, any of the light emitting units 22a3, 22b3, . . . according to the second exemplary embodiment emits light having a different color depending on each of the first and second notification instructions. This enables a user to identify content of a notification instruction with a color of the light emitting unit 22a3, 22b3, . . . .

However, a method for identifying content of a notification instruction is not limited to this, but may be one that, depending on content of a notification instruction, changes a light emitting mode of a corresponding light emitting unit 22a3, 22b3, . . . . For example, each of the communication equipments 20a, 20b, . . . according to the variation of the second exemplary embodiment may be configured to, when receiving the first notification instruction, make a corresponding light emitting unit 22a3, 22b3, . . . emit light in a first mode, and on the other hand, when receiving the second notification instruction, emit the light emitting unit 22a3, 22b3, . . . emit light in a second mode. Specifically, the first mode is a mode that blinks the light emitting unit 22a3, 22b3, . . . , and the second mode is a mode that keeps the light emitting unit 22a3, 22b3, . . . emitting light.

Third Exemplary Embodiment

Figure 13:
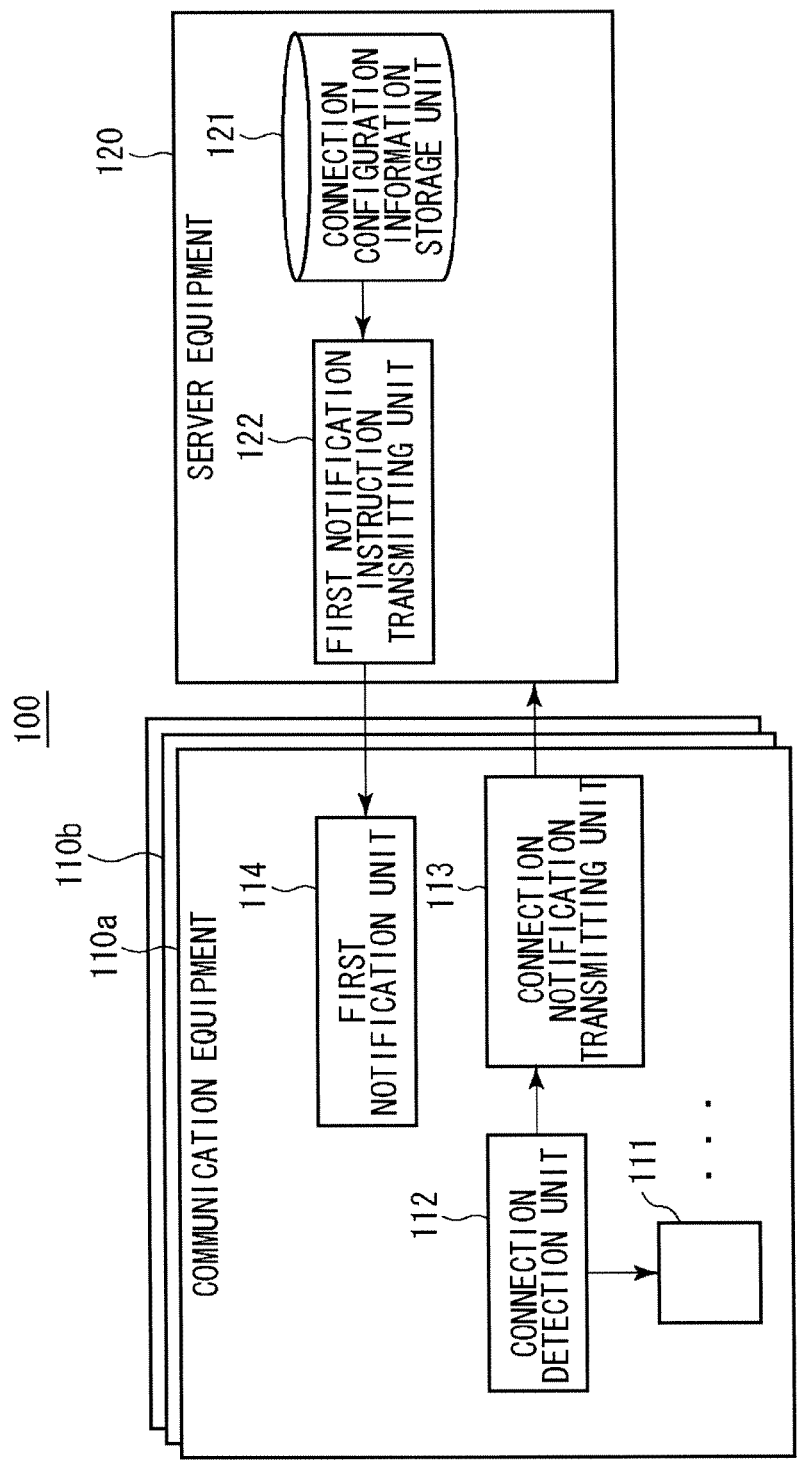
FIG. 13 is a block diagram representing an outline of functions of a communication system according to a third exemplary embodiment of the present invention.

Next, a communication system according to a third exemplary embodiment of the present invention is described referring to FIG. 13.

The communication system 100 according to the third exemplary embodiment is a system provided with: a plurality of communication equipments 110a, 110b, . . . that are configured to be mutually connectable through a communication cable; and a server equipment 120 that are communicatively connected to each of the plurality of communication equipments 110a, 110b, . . . .

Each of the plurality of communication equipments 110a, 110b, . . . is provided with at least one communication port 111 that is detachably connected with a communication cable. Also, each of the plurality of communication equipments 110a, 110b, . . . is provided with a connection detection unit 112 and a connection notification transmitting unit 113. The connection detection unit 112 detects that the communication cable is connected to the communication port 111. In the case where it is detected that the communication cable is connected to the above communication port, the connection notification transmitting unit 113 transmits, to the above server equipment 120, connection notification including communication port identification information for representing the detection and identifying the communication port.

Further, the server equipment 120 is provided with a connection configuration information storage unit 121 and a first notification instruction transmitting unit 122. The connection configuration information storage unit 121 stores at least one piece of connection configuration information including one set of connection port identification information respectively for identifying one set of communication ports connected through a communication cable. When receiving the above connection notification from any of the communication equipments 110a, 110b, . . . , the first notification instruction transmitting unit 122 transmits, to another communication equipment 110a, 110b, . . . provided with a communication port indicated by communication port identification information included in connection configuration information that is from among the pieces of connection configuration information stored in the connection configuration information storage unit 121 and includes other communication port identification information included in the connection notification, first notification instruction including the communication port identification information.

In addition, each of the plurality of communication equipments 110a, 110b, . . . is provided with a first notification unit 114 that, when the communication equipment 110a, 110b, . . . receives the first notification instruction from the server equipment 120, notifies a user of request to connect a communication cable to the communication port indicated by the communication port identification information included in the first notification instruction.

According to this, when a user connects one end of a communication cable to a communication port 111, any of the communication equipments 110a, 110b, . . . , which is provided with the communication port 111, transmits connection notification to the server equipment 120. This causes the server equipment 120 to, on the basis of the pieces of stored connection configuration information and communication port identification information included in the received connection notification, transmit a first notification instruction to another communication equipment 110a, 110b, . . . provided with another communication port 111 to be connected with the other end of the above communication cable.

The another communication equipment 110a, 110b, . . . having received the first notification instruction notifies the user of request to connect the communication cable to the another communication port 111 indicated by communication port identification information included in the first notification instruction. As a result, when connecting the one end of the communication cable to the communication port 111, the user can easily identify the another communication port 111 to be connected with the other end of the communication cable.

Fourth Exemplary Embodiment

Next, a communication system according to a fourth exemplary embodiment of the present invention is described referring to FIGS. 2, and 14 to 17. The communication system according to the fourth exemplary embodiment is different from that of the first exemplary embodiment in that communication confirmation information between communication equipments is transmitted in response to a communication confirmation request from a server equipment 10, and the rest of a configuration and operation are the same as those of the first exemplary embodiment. In the following, a configuration and operation that are different from those of the first exemplary embodiment are described.

(Configuration)

In response to communication confirmation request from the server equipment 10, the communication confirmation information transmitting unit 32 according to the fourth exemplary embodiment transmits communication confirmation information to a communication cable connected to a communication port indicated by the communication confirmation request.

The communication confirmation notification receiving unit 44 according to the fourth exemplary embodiment uses, as a search key, one set (two pieces) of communication port identification information included in received communication confirmation notification to search the connection configuration information storage unit 42 (connection configuration table), and updates communication confirmation status information corresponding to the one set of communication port identification information to "communication confirmed" (e.g., sets the communication confirmation status information to "1"). Also, the communication confirmation notification receiving unit 44 outputs the received communication confirmation notification to the notification information output unit 45.

The notification information output unit 45 confirms, on the basis of the communication confirmation notification, that communication becomes available between a communication port pair preset in the server equipment 10. When confirming communication connection between the communication port pair, the notification information output unit 45 outputs, in a viewable manner, notification information indicating the communication port pair between which a communication cable is correctly connected as expected to complete the communication connection. Note that the communication confirmation notification is transmitted only from one of communication equipments of which the communication port pair is correctly connected with the communication cable, and therefore on the basis of the communication confirmation notification, the notification information output unit 45 can confirm that the communication cable is correctly connected, and between the communication port pair, the communication becomes available.

(Operation)

Next, the operation of the communication system in the fourth exemplary embodiment is described. In the following, the same operation as that in the first exemplary embodiment is described with being added with the same symbols as those in the first exemplary embodiment, and details of different operation are described.

Figure 14:
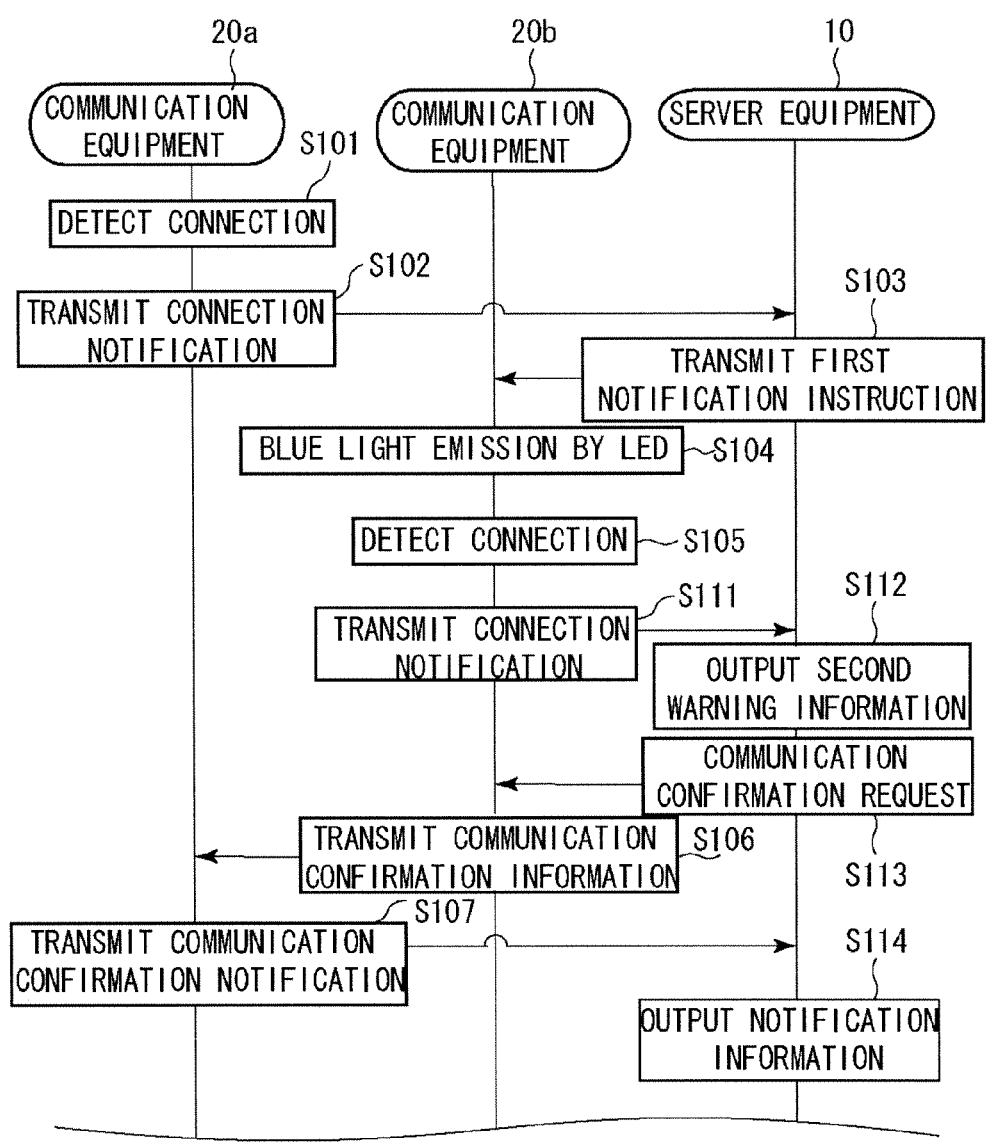
FIG. 14 is a sequence diagram illustrating operation of a communication system according to a fourth exemplary embodiment of the present invention.

Referring to FIG. 14, described is operation up to, in response to connection of a communication cable to the communication port 22a1 of the communication equipment 20a, urging to connect the communication cable to the communication equipment 20b that is not connected.

Figure 15:
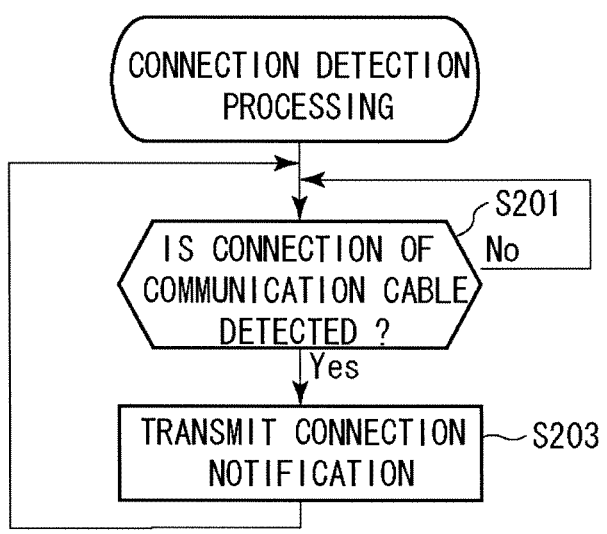
FIG. 15 is a flowchart illustrating a connection detection processing program executed by a communication equipment according to the fourth exemplary embodiment of the present invention.
Figure 16:
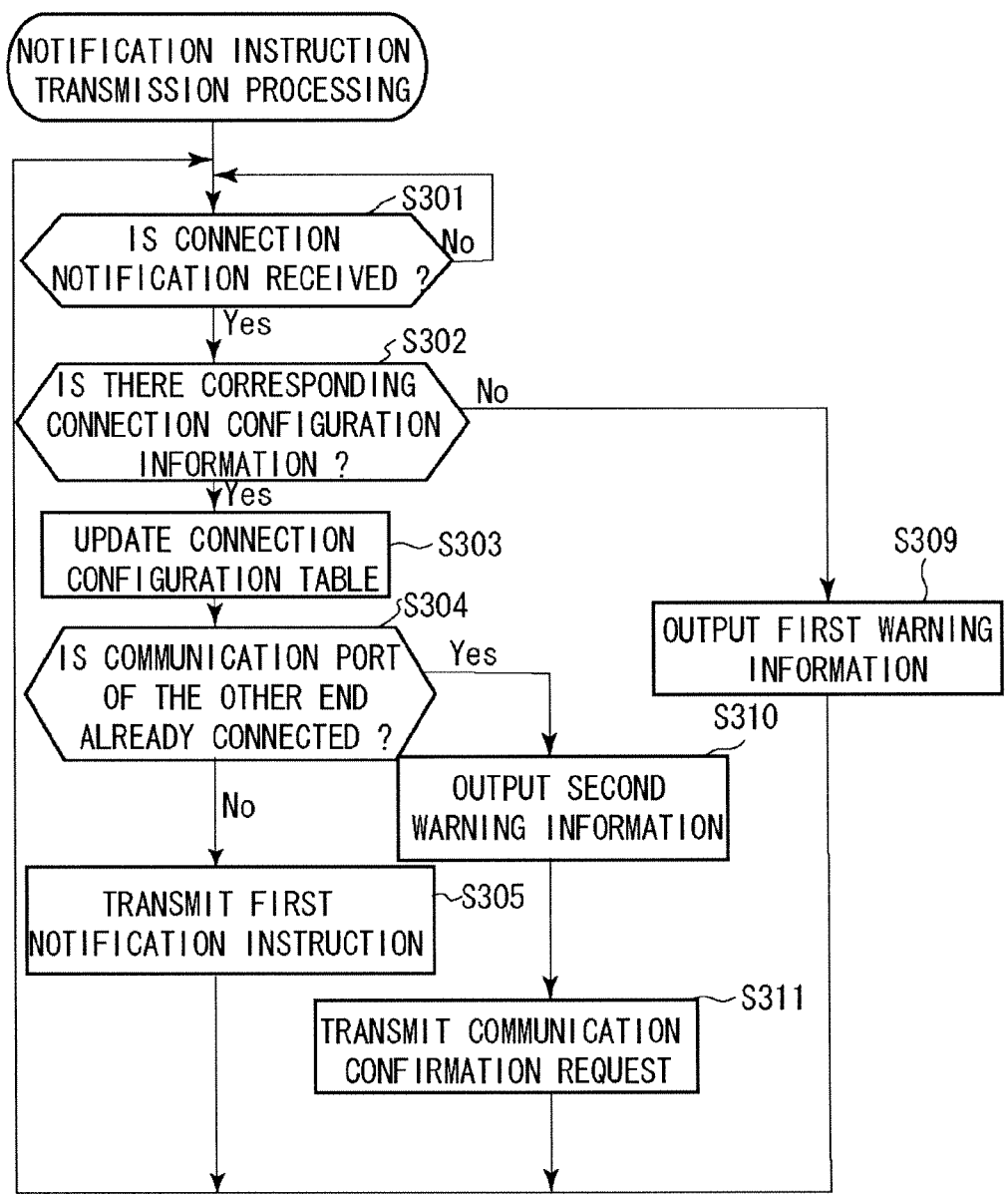
FIG. 16 is a flowchart illustrating a notification instruction transmission processing program executed by a server equipment according to the fourth exemplary embodiment of the present invention.

During activation of the communication equipment 20a, the CPU of the communication equipment 20a executes a connection detection processing program illustrated by a flowchart of FIG. 15. To describe specifically, when starting to process the connection detection processing program, the communication equipment 20a waits in Step S201 until it detects the connection of the communication cable.

The communication equipment 20a having detected the connection of the communication cable determines a result in Step S401 as "Yes", and proceeds to Step S203 to transmit connection notification to the server equipment 10 (Step S203). Specifically, the communication equipment 20a transmits, to the server equipment 10, the connection notification including communication port identification information "PID1" on the communication port 20a1 connected with the communication cable. Subsequently, the communication equipment 20a returns to Step S201 to wait until a communication cable is connected to another communication port, and when detecting the connection, performs the processing step in Step S203.

Referring to FIG. 14, when a user (e.g., an administrator of the communication system 1) connects one end of the communication cable to the communication port 22a1 of the communication equipment 20a, the connection detection unit 22a2 of the communication device 20a detects that the communication cable is connected to the communication port 22a1 (Step S101). On the basis of this, the communication equipment 20a transmits, to the server equipment 10, the connection notification including the communication port identification information "PID1" on the communication port 20a1 connected with the communication cable (Step S102).

When the connection notification is transmitted from the communication equipment 20a, as in the first exemplary embodiment, the server equipment 10 transmits a first notification instruction to the communication equipment 20b (Step S103).

In an example illustrated in FIG. 14, in the communication equipment 20b having received the first notification instruction from the server equipment 10, as in the first exemplary embodiment, the light emitting unit 22a3 for the communication port 22a1 corresponding to the first notification instruction emits light. On the basis of this, the user recognizes that the user should connect the other end of the communication cable connected to the communication port 22a1 of the communication equipment 20a to the communication port 22a1 of the communication equipment 20b. Then, the user connects the other end of the communication cable to the communication port 22a1 of the communication equipment 20b.

As with the communication equipment 20a, the communication equipment 20b executes the connection detection processing program illustrated in FIG. 15. Accordingly the communication equipment 20b having detected the connection of the communication cable to the communication port 22a1 transmits connection notification including communication port identification information "PID2" to the server equipment 10.

On the basis of the set of connection notification received from the communication equipments 20a and 20b, the server equipment 10 according to the fourth exemplary embodiment confirms the connection of both of the communication port pair expected to be connected. At this time, whether or not communication is available between the communication port pair is not confirmed, and therefore the server equipment 10 outputs, in a viewable manner, second warning information and transmits a communication confirmation request to the communication equipment 20b (Steps S112 and S113). The communication confirmation request includes the pieces of communication port identification information for identifying the communication port pair.

In response to the communication confirmation request, the communication equipment 20b transmits communication confirmation information including the communication port identification information "PID2" for identifying the communication port 22a1 to the communication cable (here, the other communication equipment 20a) through the communication port 22a1 (Step S106). This causes the communication equipment 20a to receive the communication confirmation information including the communication port identification information "PID2" from the communication equipment 20b.

As in the first exemplary embodiment, the communication equipment 20a transmits communication confirmation notification to the server equipment 10 (Step S107).

Figure 17:
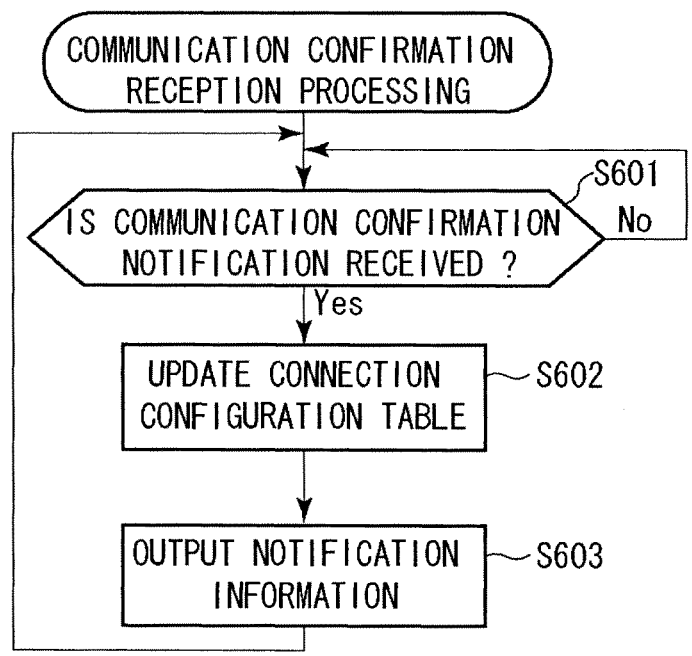
FIG. 17 is a flowchart illustrating a communication confirmation reception processing program executed by the server equipment according to the first exemplary embodiment of the present invention.

On the other hand, during activation of the server equipment 10, the CPU of the server equipment 10 according to the fourth exemplary embodiment executes a communication confirmation reception processing program illustrated by a flowchart of FIG. 17. As in the first exemplary embodiment, the server equipment 10 waits in Step S601 until it receives the communication confirmation notification, and when receiving the communication confirmation notification, updates communication confirmation status information in connection configuration information indicated by the pieces of communication port identification information included in the communication confirmation notification to "communication availability confirmed" (Step S602). Subsequently, the server equipment 10 outputs, in a viewable manner, notification information indicating that the connection between the communication port pair is completed (Step S603 and Step S114 in FIG. 4). At this time, it is preferable to stop the output of the second warning information.

As described above, in the communication system in the fourth exemplary embodiment, the server equipment 10 having confirmed the connection from the communication equipments 20a and 20b controls communication confirmation operation between the communication equipments. This enables unnecessary communication availability/unavailability confirmation operation by the communication equipment 20a having detected the connection of the communication cable to be omitted.

In the above, the present invention has been described referring to the above exemplary embodiments; however, the present invention is not limited to any of the above-described exemplary embodiments. Various modifications that one having ordinary skill in the art can appreciate can be made to constitution and detail of the present invention within the scope of the present invention.

Note that each of the functions of the communication system 1 in any of the above exemplary embodiments is realized by the CPUs executing the programs (software): however they may be realized by hardware such as a circuit.

Also, in each of the above exemplary embodiments, the programs are stored in the storage devices; however, they may be stored in a computer-readable recording medium. For example, the recording medium is a portable medium such as a flexible disk, an optical disk, a magneto-optical disk, or a semiconductor memory.

Further, as another variation of the above exemplary embodiments, any combination of the above-described exemplary embodiments and variation may be employed. For example, the first warning information or second warning information may be outputted to any of the communication equipments 20a and 20b each of which is a transmission source of connection notification. In this case, each of the communication equipments 20a and 20b is preferably provided with an output device that outputs, in a viewable manner, the first or second warning information. Alternatively, the light emitting unit 22a3 may emit light in a mode that identifies the first or second warning information (identifies it by a light emission color, blinking interval, or the like).

<Supplementary Notes>

Part or all of the above-described exemplary embodiments can be described as in the following Supplementary notes, but not limited to the following.

(Supplementary Note 1)

A communication system comprising: a plurality of communication equipments that are configured to be mutually connectable through a communication cable; and a server equipment that is communicatively connected to each of the plurality of communication equipments, wherein:

each of the plurality of communication equipments comprises at least one communication port that is detachably connected with the communication cable, and also comprises a connection detection unit that detects that the communication cable is connected to the communication port, and a connection notification transmitting unit that, if it is detected that the communication cable is connected to the communication port, transmits, to the server equipment, connection notification including communication port identification information for representing the detection and identifying the communication port;

the server equipment comprises a connection configuration information storage unit that stores at least one piece of connection configuration information including pieces of communication port identification information for respectively identifying one set of communication ports connected through the communication cable, and a first notification instruction transmitting unit that, if the connection notification is received from the communication equipment, transmits, to a communication equipment provided with a communication port indicated by communication port identification information included in connection configuration information including other communication port identification information included in the connection notification, a first notification instruction including the communication port identification information, the connection configuration information being from among the stored connection configuration information; and each of the plurality of communication equipments further comprises a first notification unit that, if the first notification instruction is received from the server equipment, notifies a user of request to connect the communication cable to the communication port indicated by the communication port identification information included in the first notification instruction.

According to this, when the user connects one end of a communication cable to a communication port, a communication equipment provided with the communication port transmits connection notification to the server equipment. This causes the server equipment to, on the basis of the stored connection configuration information and communication port identification information included in the received connection notification, transmit first notification instruction to a communication equipment provided with a communication port to be connected with the other end of the communication cable.

Then, the communication equipment having received the first notification instruction notified the user of request to connect the communication cable to the communication port indicated by communication port identification information included in the first notification instruction. As a result, when connecting the one end of the communication port to the communication port, the user can easily specifies the communication port to be connected with the other end of the communication cable.

(Supplementary Note 2)

The communication system according to Supplementary note 1, wherein the server equipment comprises a first warning information output unit that, when the connection notification is received from the communication equipment, if among the stored connection configuration information, the connection configuration information including the communication port identification information included in the connection notification is not present, outputs first warning information representing that the communication cable is erroneously connected to the communication equipment.

According to this, the server equipment outputs the first warning information if a communication port not expected to be connected with any communication cable is connected with a communication cable. This enables the user to easily recognize that the communication cable is erroneously connected to a communication equipment.

(Supplementary Note 3)

The communication system according to Supplementary note 1 or 2, wherein:

each of the plurality of communication equipments comprises a communication confirmation information transmitting unit that transmits, to the other communication equipment connected through the communication cable, communication confirmation information including the communication port identification information for identifying the communication port connected with the communication cable, a communication confirmation information receiving unit that receives the communication confirmation information from the other communication equipment connected through the communication equipment, and a communication confirmation notification transmitting unit that, when the communication confirmation information is received, transmits, to the server equipment, communication confirmation notification including the communication port identification information included in the communication confirmation information and the communication port identification information for identifying the communication port that when receiving the communication confirmation information, the device of interest uses; and the server equipment comprises a second warning information output unit that, if the connection notification including each of the set of communication port identification information included in the stored connection configuration information is received, but the communication confirmation notification including the one set of communication port identification information included in the connection configuration information is not received, outputs second warning information representing that the communication cable is erroneously connected to the communication equipment.

According to this, the server equipment outputs the second warning information if one set of communication ports that are expected to be connected by the same communication cable are respectively connected with mutually different communication cables. This enables the user to easily recognize that a communication cable is erroneously connected to a communication equipment.

(Supplementary Note 4)

The communication system according to Supplementary note 3, wherein the server equipment comprises a notification information output unit that, if the connection notification including each of the one set of communication port identification information included in the stored connection configuration information is received, and the connection confirmation notification including the one set of communication port identification information included in the connection configuration information is received, outputs notification information representing that the communication cable is correctly connected to the communication equipments.

According to this, the server equipment outputs notification information when a communication cable is connected to each of one set of communication ports as expected. This enables the user to easily recognize that the communication cable is correctly connected to communication equipments.

(Supplementary Note 5)

The communication system according to any one of Supplementary notes 1 to 4, wherein:

each of the plurality of communication equipments comprises a data amount transmitting unit that, for each of the communication ports provided for the communication equipment, transmits, to the server equipment, a transmitted data amount that is an amount of data transmitted through the communication port, and also transmits, to the server equipment, a received data amount that is an amount of data received through the communication port; and the server equipment comprises an failure detection unit that, for each of the communication ports, receives the transmitted data amount and the received data amount, and on a basis of the received transmission data amount and the received data amount, detects that a communication state between the communication ports is an abnormal state.

According to this, the server equipment can detect that the communication state between the communication ports is the abnormal state.

(Supplementary Note 6)

The communication system according to Supplementary note 5, wherein:

the server equipment comprises a second notification instruction transmitting unit that, if it is detected that the communication state between the communication ports is the abnormal state, transmits, to the communication equipments provided with the communication ports, a second notification instruction including the pieces of communication port identification information for identifying the communication ports, respectively; and each of the plurality of communication equipments further comprises a second notification unit that, if the second notification instruction is received from the server equipment, notifies the user that a state between the communication ports indicated by the pieces of communication port identification information included in the second notification instruction is the abnormal state.

According to this, the user can easily recognize that the state between the communication ports is the abnormal state. Further, the user can also easily identify the communication ports in the abnormal state.

(Supplementary Note 7)

The communication system according to any one of Supplementary notes 1 to 6, wherein the first notification unit includes a plurality of light emitting units that emit light, wherein the plurality of light emitting units are arranged with being respectively related to the communication ports provided for the device of interest, and includes a light emission control unit that, if the first notification instruction is received, makes a light emitting unit among the plurality of light emitting units emit light, the light emitting unit being arranged corresponding to the communication port indicated by the communication port identification information included in the first notification instruction.

(Supplementary Note 8)

A communication method that is applied to a communication system comprising: a plurality of communication equipments that are configured to be mutually connectable through a communication cable; and a server equipment that is communicatively connected to each of the plurality of communication equipments, wherein:

each of the plurality of communication equipments comprises at least one communication port that is detachably connected with the communication cable;

the communication equipment detects that the communication cable is connected to the communication port;

if detecting that the communication cable is connected to the communication port, the communication equipment transmits, to the server equipment, connection notification including communication port identification information for representing the detection and identifying the communication port;

if receiving the connection notification from the communication equipment, the server equipment transmits, to a communication equipment provided with a communication port indicated by communication port identification information included in connection configuration information including other communication port identification information included in the connection notification, a first notification instruction including the communication port identification information, the connection configuration information being from among pieces of connection configuration information stored in a storage device that stores at least the one piece of connection configuration information including the pieces of communication port identification information for respectively identifying the one set of communication ports connected through the communication cable; and if receiving the first notification instruction from the server equipment, the communication equipment notifies a user of request to connect the communication cable to the communication port indicated by the communication port identification information included in the first notification instruction.

(Supplementary Note 9)

The communication method according to Supplementary note 8, wherein when receiving the connection notification from the communication equipment, if among the pieces of stored connection configuration information, the connection configuration information including the communication port identification information included in the connection notification is not present, the server equipment outputs first warning information representing that the communication cable is erroneously connected to the communication equipment.

(Supplementary Note 10)

The communication method according to Supplementary note 8 or 9, wherein;

the communication equipment transmits, to the other communication equipment connected through the communication cable, communication confirmation information including the communication port identification information for identifying the communication port connected with the communication cable;

the communication equipment receives the communication confirmation information from the other communication equipment connected through the communication equipment;

if receiving the communication confirmation information, the communication equipment transmits, to the server equipment, communication confirmation notification including the communication port identification information included in the communication confirmation information and the communication port identification information for identifying the communication port that when receiving the communication confirmation information, the device of interest uses; and if receiving the connection notification including each of the one set of communication port identification information included in the stored connection configuration information, but not receiving the communication confirmation notification including the one set of communication port identification information included in the connection configuration information, the server equipment outputs second warning information representing that the communication cable is erroneously connected to the communication equipment.

(Supplementary Note 11)

A server equipment that is communicatively connected to each of a plurality of communication equipments configured to be mutually connectable through a communication cable, the server equipment comprising:

a connection configuration information storage unit that stores at least one piece of connection configuration information including pieces of communication port identification information for respectively identifying one set of communication ports connected through the communication cable, and a first notification instruction transmitting unit that, if connection notification including communication port identification information for identifying a communication port provided for a communication equipment is received from the communication equipment, transmits, to a communication equipment provided with a communication port indicated by other communication port identification information included in connection configuration information including the communication port identification information included in the connection notification, a first notification instruction including the communication port identification information, the connection configuration information being from among the stored connection configuration information.

(Supplementary Note 12)

The server equipment according to Supplementary note 11, comprising a first warning information output unit that, when the connection notification is received from the communication equipment, if among the stored connection configuration information, the connection configuration information including the communication port identification information included in the connection notification is not present, outputs first warning information representing that the communication cable is erroneously connected to the communication equipment.

(Supplementary Note 13)

The server equipment according to Supplementary note 11 or 12, comprising a second warning information output unit that, if the connection notification including each of the one set of communication port identification information included in the stored connection configuration information is received, but communication confirmation notification including the one set of communication port identification information included in the connection configuration information is not received, outputs second warning information representing that the communication cable is erroneously connected to the communication equipment.

(Supplementary Note 14)

A program intended to instruct a server equipment to realize, the server equipment being communicatively connected to each of a plurality of communication equipment configured to be mutually connectable through a communication cable, a connection configuration information storage unit that stores at least one piece of connection configuration information including pieces of communication port identification information for respectively identifying one set of communication ports connected through the communication cable, and a first notification instruction transmitting unit that, if connection notification including communication port identification information for identifying a communication port provided for a communication equipment is received from the communication equipment, transmits, to a communication equipment provided with a communication port indicated by other communication port identification information included in connection configuration information including the communication port identification information included in the connection notification, a first notification instruction including the communication port identification information, the connection configuration information being from among the stored connection configuration information.

(Supplementary Note 15)

The program according to Supplementary note 14, the program being intended to further instruct the server equipment to realize a first warning information output unit that, when the connection notification is received from the communication equipment, if among the stored connection configuration information, the connection configuration information including the communication port identification information included in the connection notification is not present, outputs first warning information representing that the communication cable is erroneously connected to the communication equipment.

(Supplementary Note 16)

The program according to Supplementary note 14 or 15, the program being intended to further instruct the server equipment to realize a second warning information output unit that, if the connection notification including each of the one set of communication port identification information included in the stored connection configuration information is received, but communication confirmation notification including the one set of communication port identification information included in the connection configuration information is not received, outputs second warning information representing that the communication cable is erroneously connected to the communication equipment.

(Supplementary Note 17)

A communication equipment that is communicatively connected to a server equipment and configured to be connectable to another device through a communication cable, the communication equipment comprising at least one communication port that is detachably connected with the communication cable, and also comprising:

a connection detection unit that detects that the communication cable is connected to the communication port;

a connection notification transmitting unit that, if it is detected that the communication cable is connected to the communication port, transmits, to the server equipment, connection notification including communication port identification information for representing the detection and identifying the communication port; and a first notification unit that, if first notification instruction including communication port identification information for identifying a communication port is received from the server equipment, notifies a user of request to connect the communication cable to the communication port indicated by the communication port identification information included in the first notification instruction.

(Supplementary Note 18)

The communication equipment according to Supplementary note 17, comprising:

a communication confirmation information transmitting unit that transmits, to the another communication equipment connected through the communication cable, communication confirmation information including the communication port identification information for identifying the communication port connected with the communication cable;

a communication confirmation information receiving unit that receives the communication confirmation information from the another communication equipment connected through the communication equipment; and a communication confirmation notification transmitting unit that, when the communication confirmation information is received, transmits, to the server equipment, communication confirmation notification including the communication port identification information included in the communication confirmation information and the communication port identification information for identifying the communication port that when receiving the communication confirmation information, the device of interest uses.

(Supplementary Note 19)

A program intended to instruct a communication equipment to realize, the communication equipment being communicatively connected to a server equipment, also configured to be connectable to another device through a communication cable, and comprising at least one communication port that is detachably connected with the communication cable, a connection detection unit that detects that the communication cable is connected to the communication port;

a connection notification transmitting unit that, if it is detected that the communication cable is connected to the communication port, transmits, to the server equipment, connection notification including communication port identification information for representing the detection and identifying the communication port; and a first notification unit that, if first notification instruction including communication port identification information for identifying the communication port is received from the server equipment, notifies a user of request to connect the communication cable to the communication port indicated by the communication port identification information included in the first notification instruction.

(Supplementary Note 20)

The program according to Supplementary note 19, the program being intended to further instruct the communication equipment to realize a communication confirmation information transmitting unit that transmits, to the another communication equipment connected through the communication cable, communication confirmation information including the communication port identification information for identifying the communication port connected with the communication cable, a communication confirmation information receiving unit that receives the communication confirmation information from the another communication equipment connected through the communication equipment, and a communication confirmation notification transmitting unit that, when the communication confirmation information is received, transmits, to the server equipment, communication confirmation notification including the communication port identification information included in the communication confirmation information and the communication port identification information for identifying the communication port that when receiving the communication confirmation information, the device of interest uses.

The present invention may be applied to a communication system in which a server equipment controls a communication route including a plurality of communication equipments (for example, a system using the OpenFlow). It should be noted that this application is based upon Japanese Patent Application JP-2010-035684 and the disclosure of Japanese Patent Application JP-2010-035684 is incorporated herein in its entirety by reference.

The invention claimed is:

1. A communication system comprising:
a plurality of communication equipments; and
a server equipment communicatively connected to each of said plurality of communication equipments,
wherein each of said plurality of communication equipments comprises:

a communication port to which a communication cable is connected in a detachable manner;

a connection notification transmitting unit configured to transmit, to said server equipment, communication port identification information for identifying said communication port to which said communication cable is connected; and a first notification unit configured to indicate, in a viewable manner, a communication port corresponding to a first notification instruction received from said server equipment as a communication port to which the communication cable is required to be connected, wherein said server equipment comprises:
 a connection configuration information storage unit configured to store connection configuration information indicating a correspondence relationship between a pair of communication ports expected to be connected with each other through said communication cable and a connection status of said pair of communication ports and said communication cable; and
 a first notification instruction transmitting unit configured to refer to said connection configuration information corresponding to said communication port identification information received from any of said plurality of communication equipments, and to transmit, if another communication port of said pair of communication ports other than the communication port corresponding to said communication port identification information is not yet connected to said communication cable, said first notification instruction for identifying said another communication port to a communication equipment having said another communication port, wherein said server equipment further comprises a second warning information output unit.

2. The communication system according to claim 1,
wherein said server equipment further comprises a first warning information output unit, and
wherein if connection configuration information corresponding to said communication port identification information received from any of said plurality of communication equipments is not stored in said connection configuration information storage unit, said first warning information output unit outputs, in a viewable manner, first warning information representing that said communication cable is erroneously connected to a communication port corresponding to said communication port identification information.

3. The communication system according to claim 2,
wherein each of said plurality of communication equipments further comprises:
 a connection notification transmitting unit configured to transmit said communication port identification information to said communication cable; and
 a communication confirmation notification transmitting unit configured to transmit, if another communication port identification information transmitted from a connection notification transmitting unit of another communication equipment is received through said communication cable, communication confirmation notification including said communication port identification information and said another communication port identification information to said server equipment,
wherein said server equipment further comprises a second warning information output unit, and wherein if said connection configuration information including said communication port identification information and said another communication port identification information received from any of said plurality of communication equipments is stored in said connection configuration information storage unit and said communication confirmation notification is not received, said second warning information output unit outputs, in a viewable manner, second warning information representing communication error between said communication port and said another communication port.

4. The communication system according to claim 2,
wherein each of said plurality of communication equipments comprises a data amount transmitting unit configured to transmit, to said server equipment, amount of data transmitted through said communication port and to transmit, to said server equipment, amount of data received through said communication port, and
wherein said server equipment comprises a failure detection unit configured to detect, based on said amount of data transmitted and said amount of data received, that communication through said communication port is in abnormal state.

5. The communication system according to claim 2,
wherein said first notification unit comprises:
 a plurality of light emitting units provided with respect to a plurality of communication ports; and
 a light emission control unit configured to activate said light emitting unit provided with respect to a communication port identified by the communication port identification information included in said first notification instruction received from said server equipment.

6. The server equipment used in the communication system according to claim 2.

7. The communication system according to claim 1,
wherein each of said plurality of communication equipments further comprises:
 a connection notification transmitting unit configured to transmit said communication port identification information to said communication cable; and
 a communication confirmation notification transmitting unit configured to transmit, if another communication port identification information transmitted from a connection notification transmitting unit of another communication equipment is received through said communication cable, communication confirmation notification including said communication port identification information and said another communication port identification information to said server equipment,
and
wherein if said connection configuration information including said communication port identification information and said another communication port identification information received from any of said plurality of communication equipments is stored in said connection configuration information storage unit and said communication confirmation notification is not received, said second warning information output unit outputs, in a viewable manner, second warning information representing communication error between said communication port and said another communication port.

8. The communication system according to claim 7,
wherein said server equipment further comprises a notification information output unit, and
wherein if said connection configuration information including said communication port identification information and said another communication port identification information received from any of said plurality of communication equipments is stored in said connection configuration information storage unit and said communication confirmation notification is received, said notification information output unit outputs notification information representing that said communication cable is correctly connected between said communication port and said another communication port.

9. The communication system according to claim 8,
wherein each of said plurality of communication equipments comprises a data amount transmitting unit configured to transmit, to said server equipment, amount of data transmitted through said communication port and to transmit, to said server equipment, amount of data received through said communication port, and
wherein said server equipment comprises a failure detection unit configured to detect, based on said amount of data transmitted and said amount of data received, that communication through said communication port is in abnormal state.

10. The communication system according to claim 8,
wherein said first notification unit comprises:
a plurality of light emitting units provided with respect to a plurality of communication ports; and
a light emission control unit configured to activate said light emitting unit provided with respect to a communication port identified by the communication port identification information included in said first notification instruction received from said server equipment.

11. The communication system according to claim 7,
wherein each of said plurality of communication equipments comprises a data amount transmitting unit configured to transmit, to said server equipment, amount of data transmitted through said communication port and to transmit, to said server equipment, amount of data received through said communication port, and
wherein said server equipment comprises a failure detection unit configured to detect, based on said amount of data transmitted and said amount of data received, that communication through said communication port is in abnormal state.

12. The communication system according to claim 7,
wherein said first notification unit comprises:
a plurality of light emitting units provided with respect to a plurality of communication ports; and
a light emission control unit configured to activate said light emitting unit provided with respect to a communication port identified by the communication port identification information included in said first notification instruction received from said server equipment.

13. The communication system according to claim 1,
wherein each of said plurality of communication equipments comprises a data amount transmitting unit configured to transmit, to said server equipment, amount of data transmitted through said communication port and to transmit, to said server equipment, amount of data received through said communication port, and
wherein said server equipment comprises a failure detection unit configured to detect, based on said amount of data transmitted and said amount of data received, that communication through said communication port is in abnormal state.

14. The communication system according to claim 13,
wherein said server equipment further comprises: a second notification instruction transmitting unit configured to transmit, if the communication through said communication port being in abnormal state is detected, second notification instruction including communication port identification information for identifying said communication port to the communication equipment having said communication port, and
wherein each of said plurality of communication equipments further comprises: a second notification unit configured to output, in a viewable manner, that a state of said communication port identified by the communication port identification information included in said second notification instruction received from said server equipment is abnormal state.

15. The communication system according to claim 14,
wherein said first notification unit comprises:
a plurality of light emitting units provided with respect to a plurality of communication ports; and
a light emission control unit configured to activate said light emitting unit provided with respect to a communication port identified by the communication port identification information included in said first notification instruction received from said server equipment.

16. The communication system according to claim 13,
wherein said first notification unit comprises:
a plurality of light emitting units provided with respect to a plurality of communication ports; and
a light emission control unit configured to activate said light emitting unit provided with respect to a communication port identified by the communication port identification information included in said first notification instruction received from said server equipment.

17. The communication system according to claim 1,
wherein said first notification unit comprises:
a plurality of light emitting units provided with respect to a plurality of communication ports; and
a light emission control unit configured to activate said light emitting unit provided with respect to a communication port identified by the communication port identification information included in said first notification instruction received from said server equipment.

18. The server equipment used in the communication system according to claim 1.

19. The communication equipment used in the communication system according to claim 1.

20. A communication method comprising:
retaining, by a server equipment, connection configuration information indicating a correspondence relationship between a pair of communication ports expected to be connected with each other through a communication cable and a connection status of said pair of communication ports and said communication cable;
transmitting, by a communication equipment, communication port identification information for identifying a communication port to which said communication cable is connected, to said server equipment,
referring, by said server equipment, to the connection configuration information corresponding to said communication port identification information and transmitting, if another communication port of said pair of communication ports other than the communication port corresponding to said communication port identification information is not yet connected to said communication cable, a first notification instruction for identifying said another communication port to another communication equipment having said another communication port;

indicating in a viewable manner, by said another communication equipment, said another communication port corresponding to said first notification instruction as a communication port to which the communication cable is required to be connected;

transmitting, by said communication equipment, said communication port identification information to said communication cable; and transmitting, by said communication equipment, if another communication port identification information transmitted from a connection notification transmitting unit of another communication equipment is received through said communication cable, communication confirmation notification including said communication port identification information and said another communication port identification information to said server equipment, wherein said server equipment further comprises a second warning information output unit, and wherein if said connection configuration information including said communication port identification information and said another communication port identification information received from the communication equipment is stored in said connection configuration information storage unit and said communication confirmation notification is not received, said second warning information output unit outputs, in a viewable manner, second warning information representing communication error between said communication port and said another communication port.

21. A server equipment connectable to a plurality of communication equipments, each of which has a communication port connectable to a communication cable, said server equipment comprising:

storage means for storing connection configuration information indicating a connection relation of a pair of communication ports, first means for specifying said pair of communication ports connected by a communication cable based on the connection configuration information; and second means for transmitting a connection instruction to said communication equipment such that said communication cable is connected with said communication port corresponding to the specified pair of communication ports, wherein a connection instructing means of said communication equipment determines whether the connection configuration information include information of said pair of communication ports, based on the connection of said communication cable with one of said communication ports of said pair, and when the connection configuration information does not include the information of said pair of communication ports, said connection instructing means receives the connection instruction from said server equipment which is operable to transmit warning information to said communication equipment, and changes a display state of a display unit in response to the connection instruction.

22. The server equipment according to claim 21, wherein said second means is operable to transmit the connection instruction to said communication equipment based on the connection of said connection cable with a first communication port of said pair of communication ports such that said communication cable is connected with a second communication port of said pair of communication ports.

23. The server equipment according to claim 21, wherein said second means is operable to determine whether the connection configuration information include information of said pair of communication ports based on the connection of said communication cable with said communication port of said pair.

24. The server equipment according to claim 21, wherein said second means is operable to determine whether the connection configuration information include information of said pair of communication ports based on the connection of said communication cable with said communication port of said pair, and to transmit warning information to said communication equipment, when the connection configuration information does not include the information of said pair of communication ports.

25. The server equipment according to claim 21, wherein said second means is operable to detect the connection of said communication cable to said first and second communication ports, and to transmit warning information to said communication equipment based on a communication situation between said first and second communication ports.

26. The server equipment according to claim 21, wherein said second means is operable to change a display state of a display unit of said communication equipment in response to the connection instruction.

27. A communication equipment comprising:

a communication port connectable with a communication cable; and connection instructing means configured to receive a connection instruction from a server equipment which has connection configuration information indicating a connection relation between a pair of communication ports, such that said communication cable is connected with said communication ports of said pair, and to change a display state of a display unit in response to the connection instruction, wherein said connection instructing means determines whether the connection configuration information include information of said pair of communication ports, based on the connection of said communication cable with one of said communication ports of said pair, and when the connection configuration information does not include the information of said pair of communication ports, said connection instructing means receives the connection instruction from said server equipment which is operable to transmit warning information to said communication equipment, and changes a display state of a display unit in response to the connection instruction.

28. The communication equipment according to claim 27, wherein said connection instructing means receives the connection instruction from said server equipment based on the connection of said connection cable to a first communication port of said pair of communication ports, such that said communication cable is connected with a second communication port of said pair of communication ports, and changes a display state of a display unit in response to the connection instruction.

29. The communication equipment according to claim 27, wherein said connection instructing means receives the connection instruction from said server equipment, which is operable to determine whether the connection configuration information include information of said pair of communication ports, based on the connection of said connection cable with one of said communication ports of said pair, and changes a display state of a display unit in response to the connection instruction.

30. The communication equipment according to claim 27, further comprising notifying means configured to notify a communication situation between a first communication port and a second communication port to said server equipment which detects the connection of said communication cable to said first and second communication ports.

31. A control method of a server equipment connectable with a plurality of communication equipments, each of which has a communication port connectable with a communication cable, said control method comprising:

storing connection configuration information indicating a connection relation between a pair of communication ports;

specifying said pair of communication ports connected with said communication cable based on the connection configuration information;

transmitting a connection instruction to said communication equipment such that said communication cable is connected with a communication port of said specified pair of communication ports; and determining, by the communication equipment, whether the connection configuration information includes information of said pair of communication ports, based on the connection of said communication cable with one of said communication ports of said pair, and when the connection configuration information does not include the information of said pair of communication ports, said communication equipment receiving the connection instruction from said server equipment which is operable to transmit warning information to said communication equipment, and changes a display state of a display unit in response to the connection instruction.

* * * * *